US005353355A

United States Patent [19]

Takagi et al.

[11] Patent Number: 5,353,355

[45] Date of Patent: Oct. 4, 1994

[54] IMAGE RECOGNITION DEVICE AND PATTERN-MATCH CUTTING DEVICE

[75] Inventors: Yoichi Takagi; Masayasu Kato, both of Hitachi, Japan

[73] Assignee: Hitachi, Ltd., Tokyo, Japan

[21] Appl. No.: 825,139

[22] Filed: Jan. 24, 1992

[30] Foreign Application Priority Data

Jan. 24, 1991 [JP] Japan .......................................... 3-6854

[51] Int. Cl.[5] ........................ G06K 9/00; G06F 15/46; G01N 21/00

[52] U.S. Cl. ........................................ 382/8; 364/470; 356/238

[58] Field of Search ................. 382/1, 8, 48; 364/470, 364/474.28, 474.35; 356/238; 250/302, 461.1; 358/101

[56] References Cited

U.S. PATENT DOCUMENTS

| | | | |
|---|---|---|---|
| 3,661,106 | 5/1972 | Huddelston | 250/372 |
| 3,839,637 | 10/1974 | Willis | 250/302 |
| 4,758,960 | 7/1988 | Jong | 364/470 |
| 4,905,159 | 2/1990 | Loriot | 364/470 |
| 4,982,437 | 1/1991 | Loriot | 364/470 |
| 5,125,035 | 6/1992 | Raghavan et al. | 382/8 |
| 5,204,913 | 4/1993 | Morooka et al. | 382/8 |

*Primary Examiner*—Joseph Mancuso
*Assistant Examiner*—David Fox
*Attorney, Agent, or Firm*—Antonelli, Terry, Stout & Kraus

[57] ABSTRACT

A device for recognizing and matching fabric pattern-forms for cutting is constituted by a marking CAD, a pattern-match control computer, a pattern recognition device body, a camera, a monitor and console, a mouse, a camera positioning robot, a cutter, a camera and video signal changeover mechanism, an iris controller, a pattern-match and cutting table, and so on. In the marking CAD, information concerning cutting point sequence data and pattern-matching points is generated and transferred to the control computer. The pattern-matching control computer moves the camera above each of the pattern-matching points to fetch an image to thereby measure the pattern position. The cutting point sequence data are revised on the basis of the result of the measurement. When poor recognition or erroneous-recognition occurs in the pattern recognition based on the image, the pattern position is determined manually through the monitor and console and the mouse.

4 Claims, 24 Drawing Sheets

FIG. 8

| SELECTED MODE | A | B | C | D | E |
| --- | --- | --- | --- | --- | --- |
| BRIGHT-NESS ADJUST-MENT SYSTEM | 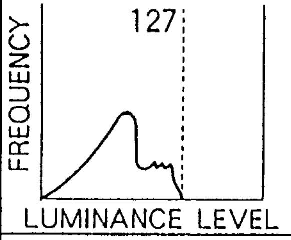  | 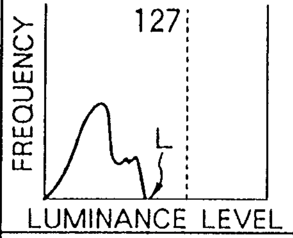  | 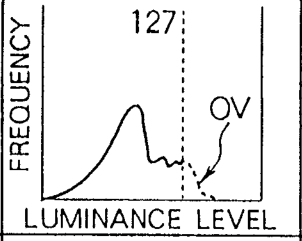  | 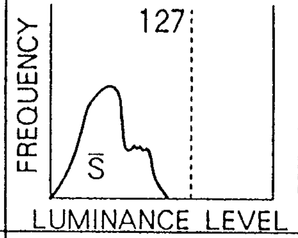  | 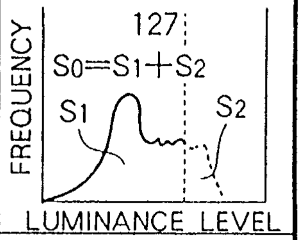  |
| PARA-METER | NO | L : LUMINANCE IN THE MAXIMUM LUMINANCE PORTION IN THE SCENE | 0V : OVERFLOW QUANTITY | $\bar{S}$ : AVERAGE LUMINANCE | $S_2/S_0$ : OVERFLOW RATE |
| EXPLANA-TION | THE MAXIMUM LUMI-NANCE PORTION IN THE SCENE IS ADJUSTED SO AS TO BE JUST BEFORE OVERFLOW OF IMAGE MEMORY | THE MAXIMUM LUMINANCE PORTION IN THE SCENE IS ADJUSTED SO AS TO BE A CONSTANT LUMINANCE (NOT LARGER THAN 127) | THE MAXIMUM LUMINANCE PORTION IN THE SCENE IS ADJUSTED SO AS TO GIVE A PREDETERMINED QUANTITY OF OVER-FLOW AFTER OVERFLOW (DESIGNATE WITH IRIS QUANTITY) | THE AVERAGE LUMINANCE ON THE WHOLE SCENE IS ADJUSTED TO A CONSTANT VALUE | THE OVERFLOW RATE IS SET TO A CONSTANT VALUE |
| APPLICA-TIONS | THE CASE IN WHICH THERE IS AN EFFECT IF PATTERN RECOGNITION IS MADE BY USING BROAD INFORMATION BETWEEN A BRIGHT PORTION AND A DARK PORTION. COMPLICATED AND POLYCHROMATIC CHECKERED PATTERNS. | THE CASE IN WHICE ONLY THE LIGHT PORTIONS ARE BINA-RIZED WITH SPECIFIC THRESHOLD TO THEREBY PERFORM RECOGNITION OF PATTERNS, SUCH AS CHECKERD PATTERNS IN WHICH THE GRAY LEVEL IS COMPARATIVELY SMALL, CHEKERED STRIPES OF ONLY TWO COLORS, AND SO ON | THE CASE IN WHICH THE FEATURE OF PATTERNS CAN BE WELL EXPRESSED WHEN PIECES OF INFORMATION HAVING BRIGHTNESS MORE THAN A CERTAIN VALUE ARE REGARDED AS ONE PATTERN, OR THE CASE IN WHICH IT IS DESIRED TO EMPHASIZE THE INFORMATION IN A LOW CONCENTRATION PORTION | THE CASE IN WHICH THE AVERAGE ILLUMINATION COMES INTO QUESTION AS IN THE GRAY LEVEL TEMPLATE MATCHING METHOD. APPLIED TO PATTERNS IN WHICH PATTERN BOUNDARY IS NOT CLEAR. | THE SAME AS MODE C, EXCEPT THAT THE CRITERION FOR OVER-FLOW IS DIFFERENT. APPLIED TO PATTERNS IN WHICH BOUNDARY OF OVERFLOW CAN BE DETERMINED BY AREA RATIO |

IMAGE RECOGNITION DEVICE AND PATTERN-MATCH CUTTING DEVICE

BACKGROUND OF THE INVENTION

The present invention relates to an image recognition device for position matching between an object such as a cutting pattern of patterned cloth and a reference image, and relates to a pattern-matching and cutting device for cutting patterned cloth into a predetermined pattern.

Heretofore, in the case of pattern-match cutting of patterned cloth, a textile is cut manually after a paper pattern is put on the textile. Because such manual cutting is inferior in efficiency compared to the automated cutting of plain cloth, there has been a strong demand for automation of pattern matching. Responding to the demand, cutting devices directed to the automation of pattern matching are described, for example, in JP-B-1-33587, JP-A-1-250465, and the like. A system for performing pattern matching while moving the contour of parts through an operator after superposing both the pattern form of cloth from a camera and the contour of parts on each other on a display is disclosed in JP-A-1-250465. According to the system, direct cutting can be made without use of the paper pattern. In JP-B-1-33587 (U.S. Pat. No. 4,853,866), a fully-automatic pattern-match cutting device is realized by performing pattern recognition of patterned cloth through an image processor. This is a system in which the effect can be expected in the case of pattern-match cutting of cloth clear in its pattern form. Further, a method in which the operator performs pattern matching manually by using an image on a monitor and a digitizer when automatic pattern matching is impossible is disclosed.

SUMMARY OF THE INVENTION

An object of the present invention is to provide an image recognition device for performing pattern recognition of delicately patterned cloths efficiently, and a pattern-match cutting device for cutting delicately patterned cloth efficiently.

It is considered that the method described in the aforementioned publication is useful for improvement of efficiency, compared with the method in which a textile is cut by a cutter while performing pattern matching after putting a paper pattern on the textile. It is, however, the present state that the conventional fully-automatic pattern-matching cutting device is so low in the recognition rate that the device cannot be adapted to cloths having delicate patterns. In this case, the method for performing pattern matching manually by the operator must be used. In the conventional manual pattern matching method, it is necessary for the operator to perform pattern matching of all matching pattern points of the patterned object cloth by using the image on the monitor. Accordingly, the method is inefficient compared with the automatic pattern matching method using an image processor. Further, the manual operation of a mouse or digitizer is required in the conventional method. Accordingly, the fatigue of the operator cannot be neglected. Accordingly, the provision of a high-efficiency and useful automatic pattern-matching cutting device by which the image processing technique is applied to cloths having delicate patterns has been in great demand.

The following problems are to be solved in order to provide the high-efficiency and useful automatic pattern-matching cutting device in which the image processing technique can be applied to the cloths having delicate patterns.

(1) Improvement of pattern recognition rate through image analysis of delicate patterns.

The present pattern recognition rate through image analysis of delicate patterns is limited. Textiles having such clear patterns that can be recognized with a recognition rate of 100% are very few. A majority of textiles have such delicate patterns that cannot always be recognized according to a pattern-matching point. It is almost impossible in practice that the delicate patterns are recognized with a recognition rate of 100%. In addressing the present state, the provision of a highly efficient pattern-matching cutting device for such delicate-patterned textiles has been in great demand.

(2) In the case where the pattern-matching point is set in the vicinity of the edge of cloth, erroneous-recognition or the like may occur if any matter, such as an image of the table on which the cloth is put, other than the cloth is contained in the camera view.

(3) Improvement of the reduction of the pattern recognition rate caused by the difference between the environment at the time of the teaching and the environment at the time of the pattern matching.

Recently, various patterns and small-quantity production has been the norm of operation. In general, a roll of cloth is cut repeatedly and individually at different time periods and in different patterns. It is not efficient and not practical to teach the image processing system at each teaching time. Accordingly, it is preferable that teaching is performed only once per one roll to use the data taught repeatedly. On the other hand, environmental conditions such as lighting conditions can change from the time whom the pattern form is taught the system to the time when the taught data is used. There arises a problem that stable pattern recognition cannot be made.

(4) Particularly in the case of the textile having patterns formed of the same-color yarn while changing the weaving style (or knitting style), it is very difficult to recognize the pattern form thereof.

A specific object of the present invention is to provide an image processing system or a pattern-matching cutting system by which the aforementioned problems can be solved either singularly or in any combination thereof.

A first feature of the present invention is that a manual pattern matching function is assigned to the automatic pattern matching system so that manual pattern matching can be performed efficiently when a judgment that pattern matching in the automatic pattern matching system is impossible is made regarding cloth having such delicate patterns as to make 100% automatic pattern matching difficult. Therefore, to conform the manual pattern matching with adjacent automatic pattern matching to thereby lighten the load imposed on the operator, information necessary for the manual positioning is given to the operator at the time of the manual pattern matching. The information for the manual positioning is set and stored in the memory at the time of the teaching, read at the time of the manual pattern matching, and displayed, for example, on a CRT.

A second feature of the invention is that not only the pattern-matching key point is superimposed on the display containing the pattern form so that the operator can check the cutting position of the cloth before cutting the cloth after performing the automatic or manual pattern matching, but the pattern matching is corrected by the manual pattern matching function according to a first feature of the invention when the cutting position error is detected.

A third feature of the invention is there there is provided a function for storing taught conditions for automatic pattern matching in advance so that the stored taught conditions can be read and displayed to reproduce the taught conditions at the time of operating the automatic pattern matching line. Examples of the taught conditions include conditions for illumination at the time of the teaching, video signal conditions for generating an image (the view field of the camera used in; spectra of light used, that is, R, G, B, or composite thereof; image processing procedure used, for example, emphasis process and contour process, etc.), and the like.

A fourth feature of the invention is the marking of yarn so as to be invisible under general light but able to be fetched as an image under illumination of a special wavelength, woven into the object cloth to make automatic pattern matching easy for cloth having delicate patterns to thereby perform the automatic pattern matching.

Other features of the invention are listed as follows.

(1) The pattern recognition device and the operator share the pattern position determining process with each other logically on the basis of the judgment as to automatic pattern recognition. Therefore, not only is the function for judging whether each pattern-match point can be recognized given to the pattern recognition device, but also the result of the recognition by the pattern recognition device is employed so that the operator can perform the pattern matching in the interactive system in the case where the pattern recognition device determines that the patterns cannot be recognized.

(2) A request for operator intervention is displayed for the operator to perform pattern matching when any matter, such as a table surface on which the cloth is put, other than the cloth enters into the camera view.

(3) A recognition evaluation algorithm is provided in the pattern recognition device for determining poor recognition or erroneous-recognition of patterns whereby the request for operator intervention is automatically displayed for the operator to perform pattern matching when the patterns cannot be recognized. Furthermore, the result of the pattern position measurement is evaluated so that the result is regarded as erroneous-recognition when the difference from the predicated value exceeds a constant value and so that the request for operator intervention is displayed for the operator to perform pattern matching.

According to the aforementioned features of the invention, pattern matching by the automatic pattern matching device can be executed even for cloths having such delicate patterns so as to make the automatic pattern matching by the pattern recognition device difficult. Pattern-matching information input at the time of the teaching of conditions for automatic pattern matching is given (for example, by CRT display) to the operator, even if a decision that the automatic pattern matching is impossible is made with the execution of the automatic pattern matching because of the delicate patterns. Accordingly, there arises an effect that manual pattern matching can be performed smoothly.

Namely, according to the present invention, there arises an effect that conforming automatic pattern matching and manual pattern matching can be made even if the patterns are so delicate that the recognition rate in automatic pattern matching cannot always be expected.

BRIEF DESCRIPTION OF THE DRAWINGS

FIG. 8 shows the display brightness control method.

DESCRIPTION OF THE PREFERRED EMBODIMENT

Figure 1:
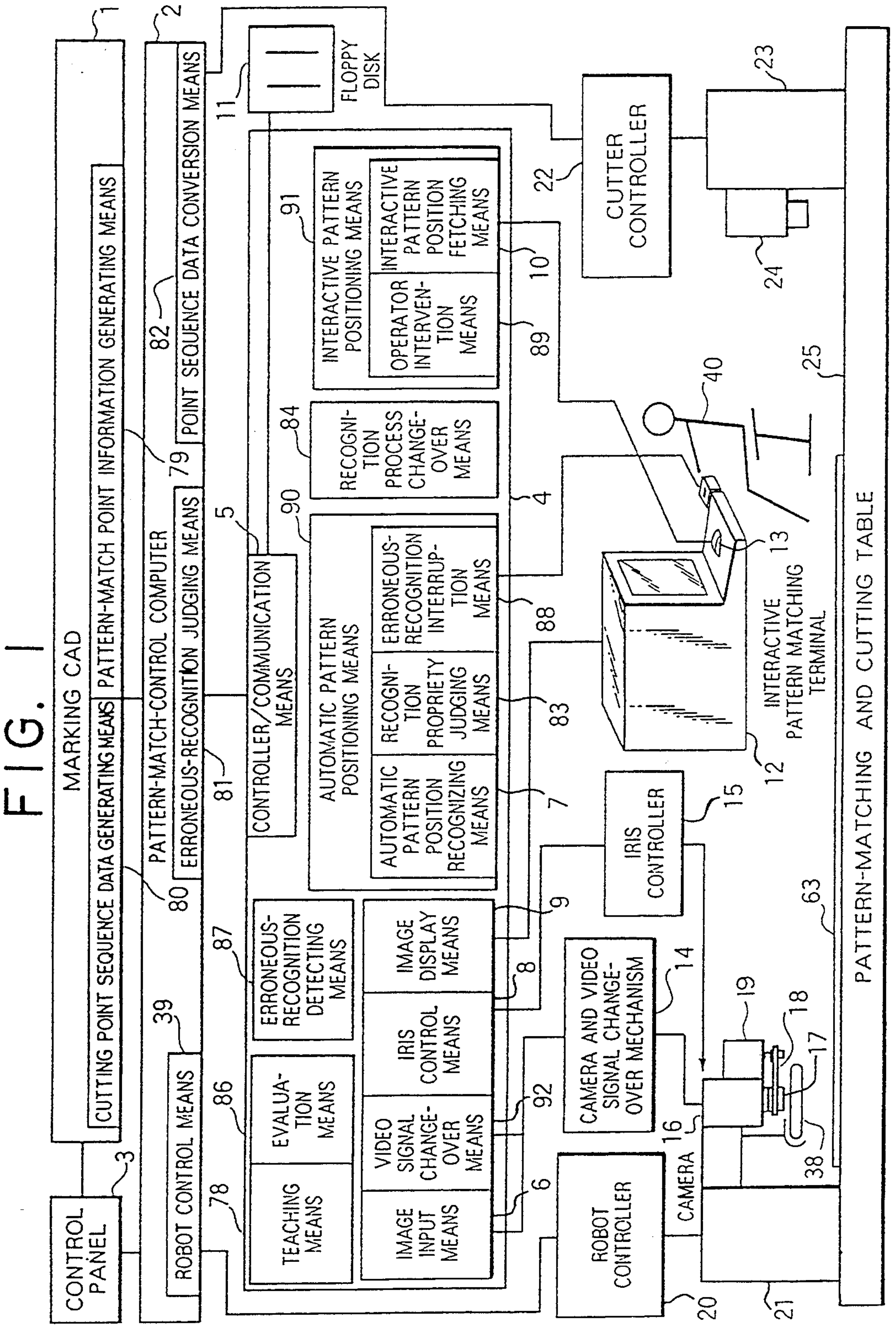
FIG. 1 shows a first embodiment of a device according to the present invention.

An embodiment of the present invention will be described hereunder with reference to the drawings. FIG. 1 shows a pattern-matching cutting device as a first embodiment of the present invention, which comprises a marking CAD 1, a pattern-match control computer 2, a control panel 3, a pattern recognition device body 4, a floppy disc 11, a monitor television and console 12, a mouse 13, an erroneous-recognition interruption button 93, a camera and video signal changeover mechanism 14, an iris controller 15, a camera 16, a camera lens 17, an iris-control lens driving belt 18, an iris-control small-size motor 19, an illuminator 38, a robot controller 20, a camera positioning two-directional robot 21, a cutting controller 22, a cutting device body 23, a cutting head 24, and a pattern-matching, a cutting table 25, and so on. The pattern recognition device body 4 is constituted by a controller and communication means 5, a teaching means 78, an evaluation means 86 for evaluating the result of the teaching, an image input means 6, a video signal changeover means 92, an iris control means 8, an image display means 9, an automatic pattern positioning means 90, an interactive (or manual) pattern positioning means 91, a recognition process changeover means 84, an erroneous-recognition detecting means 87, and so on. The automatic pattern positioning means 90 is constituted by an automatic pattern position recognizing means 7, a recognition propriety judging means 83, an erroneous-recognition interruption means 88, and so on. The interactive (or manual) pattern positioning means 91 is constituted by an operator intervention means 89, an interactive (or manual) pattern position fetching means 10, and so on. The marking CAD 1 is constituted by a cutting point sequence data generating means 80, a pattern-matching point information generating means 79, and so on. The pattern-match control computer 2 is constituted by a robot control means 39, an erroneous-recognition judging means 81, a point sequence data conversion means 82, and so on. Here, the marking CAD 1 and the pattern-match control computer 2 may be integrated with each other or the pattern recognition device 4 and the pattern-match control computer 2 may be integrated with each other.

Figure 2:
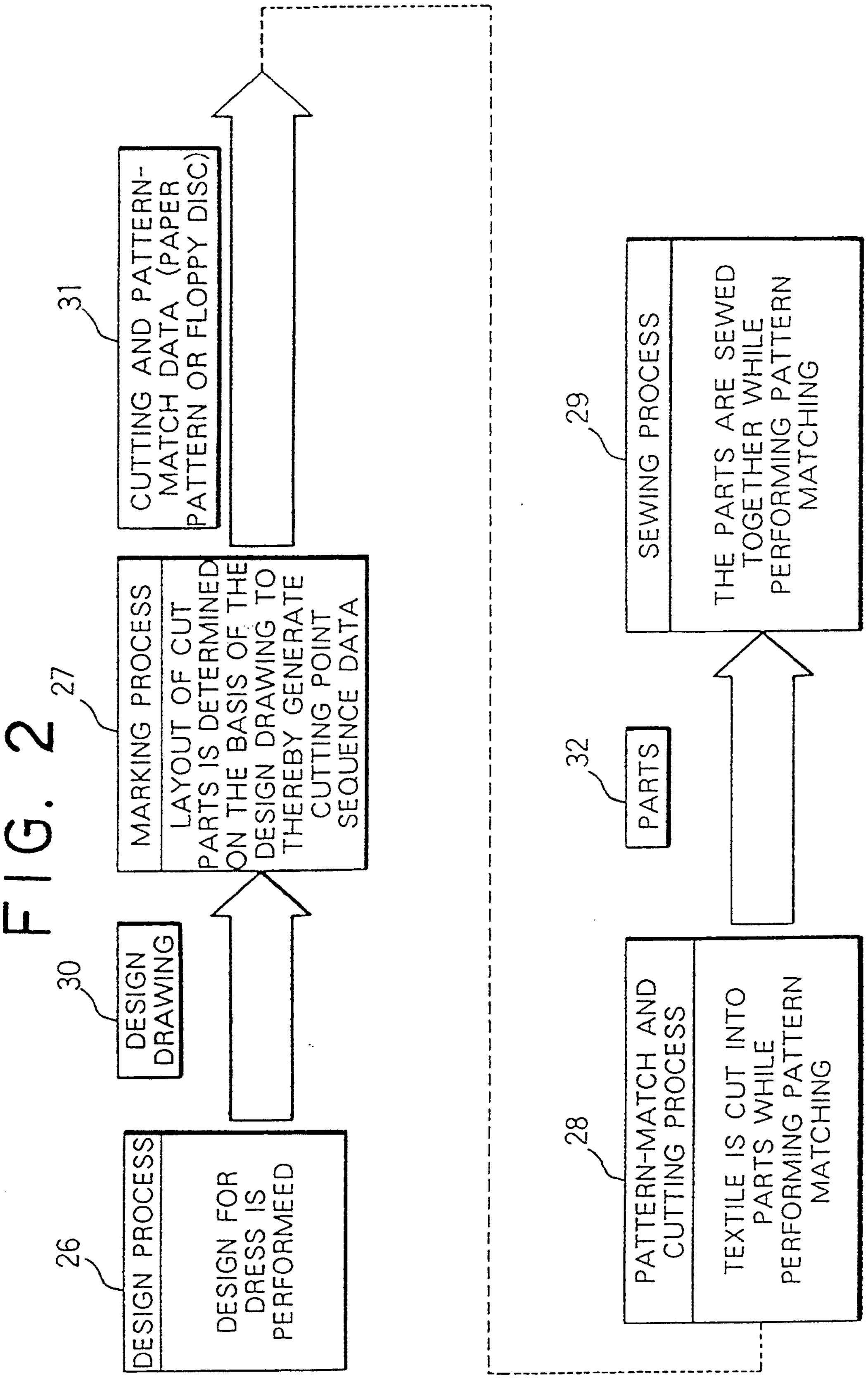
FIG. 2 shows a process for producing a patterned dress.

FIG. 2 shows a manufacturing process of a patterned dress. First for production of dresses, in a design process 26, a design drawing 30 for a dress is generated through determining the size and shape of the dress, the positions of pattern-match points, and the like. In a marking process 27, information 31 concerning cutting point sequence data and pattern-match points is generated through determining a layout of ideally patterned cut parts in two-dimensional coordinate space on the basis of the design drawing 30 for one dress. In a pattern-matching and cutting process 28, cutting a textile into parts 32 (ten-odd parts per one dress) is performed while pattern matching is performed. In a sewing process 29, the dress is finished up by combining the parts while performing pattern matching. The device of the present invention mainly concerns the marking process 27 and the pattern-match and cutting process 28.

Figure 3:
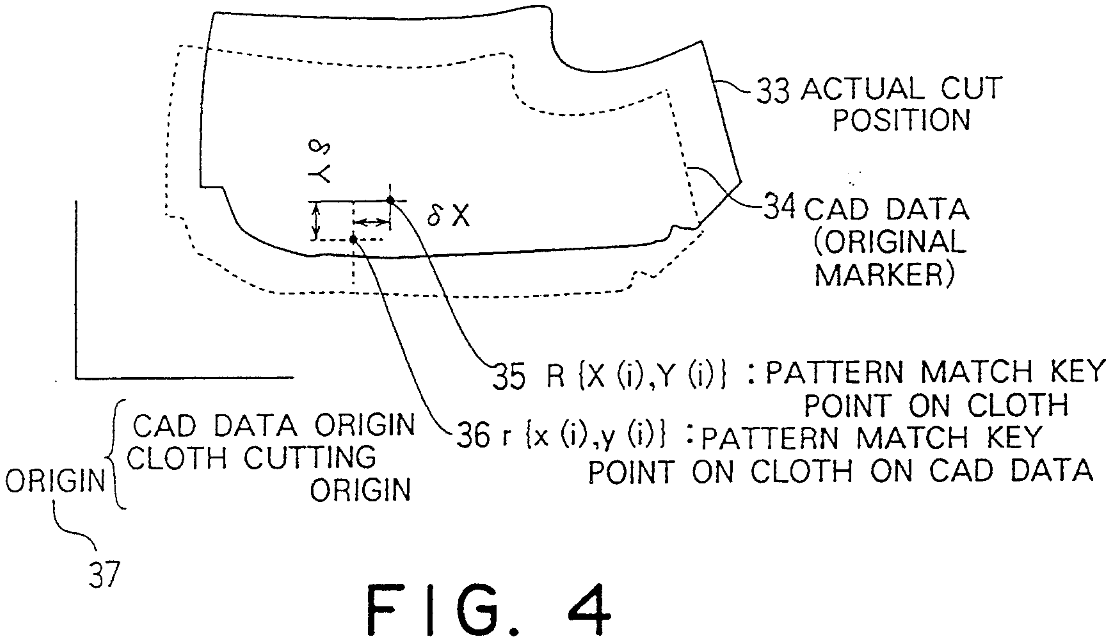
FIG. 3 shows a method for correcting the pattern-matching marker layout.

The pattern-matching and cutting process starts after cloth 63 is put on the pattern-matching and cutting table 25 shown in FIG. 1. The coordinates 36 of pattern-match points (a part of the cutting and pattern-match data 31) generated by the marking CAD are transferred to the pattern-match control computer 2. The pattern-match control computer 2 moves the camera above each of the pattern-matching points to thereby measure the pattern positions accurately. After revising the cutting point sequence data (a part of the cutting and pattern-match data 31) of the CAD data on the basis of the result of the measurement, cutting is performed on the basis of the revised point sequence data. FIG. 3 shows an example of the pattern-matching marker layout correcting method. The CAD data origin and the cloth origin are one and the same point 37, because they are made to coincide with each other at the time of starting of the pattern-matching and cutting process. The cutting and pattern-matching data 31 (cutting point sequence data 34 and pattern-match points 36) are shown by the broken line. The data 31 are information generated by 80 and 79 in the marking process and transferred from the marking CAD 1 to the pattern-matching control computer 2. The pattern-matching control computer 2 moves the camera above each of the pattern-match points 36 and then fetches an image to measure the pattern position through image analysis and through the operator 40. The reference numeral 35 designates a pattern-match point thus measured.

Point sequence data 33 expressing real cutting positions are obtained by shifting the point sequence data 34 of CAD in parallel by the difference ($\delta X$, $\delta Y$) of the coordinates between the pattern-match point 36 of CAD and the pattern-match point 35 of cloth. This data conversion is performed by the point sequence data conversion mechanism 82 in the pattern-matching control computer.

Figure 4:
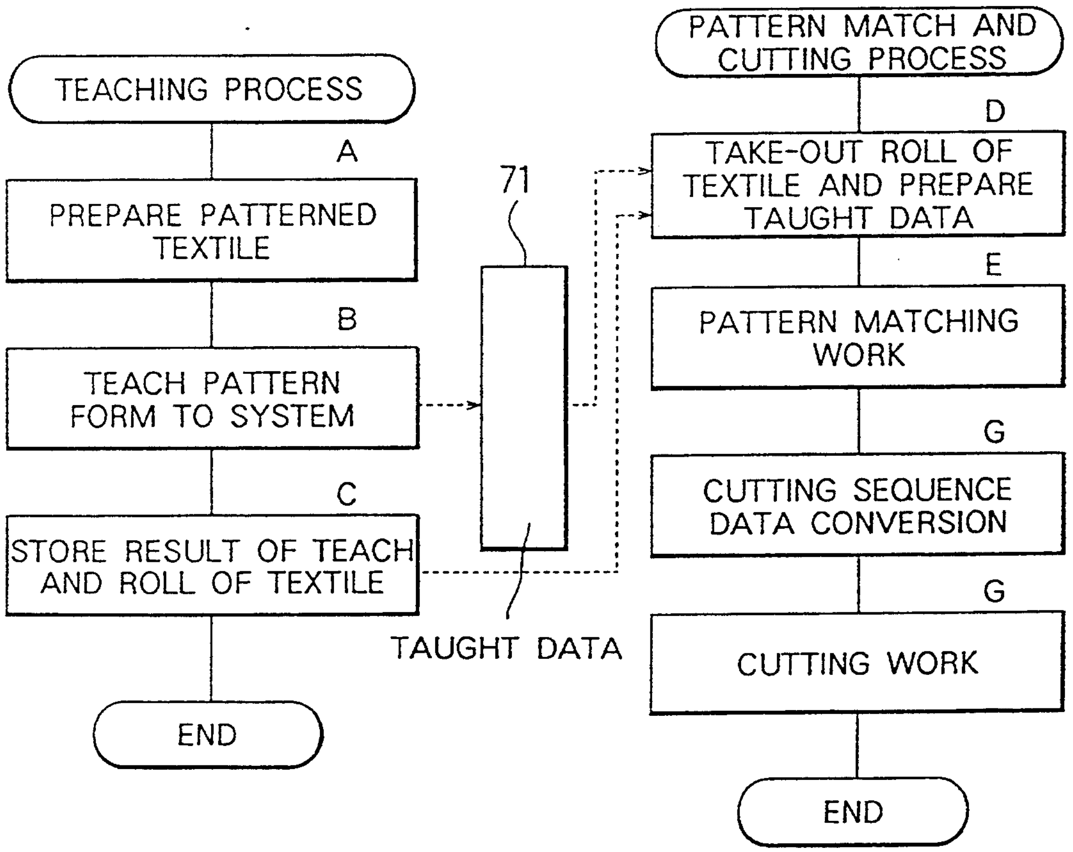
FIG. 4 shows the outline of pattern matching in the pattern-matching and cutting method according to the present invention.

FIG. 4 shows a schematic flow diagram of the pattern-matching and cutting system according to the present invention. The boxes A–C show the schematic procedure of the teaching process as a main process according to the invention. First, a patterned textile is prepared. Patterns as a subject of pattern matching are placed in a field of view of the camera to fetch an image thereof to thereby teach the system the specification of the pattern form and the pattern recognition procedure (box B). Processing conditions, such as optimum video signal, image brightness, and the like, are optimized correspondingly to the pattern form. These data are stored and reserved as taught data in the external storage device such as a floppy disk. The aforementioned teaching process is a process which depends on the differences of a textile both in kind of cloth and in pattern form but does not depend on the CAD information. Accordingly, the teaching process is performed once per one roll of textile. Even if the design changes, the same taught data can be applied to the same textile. The boxes D–G show the pattern-matching and cutting process, as another main process in this embodiment, for performing both pattern matching and cutting. The pattern-matching and cutting process is a process which is performed for each dress because the process depends on both the CAD data and cloth condition. In the latest production line for various patterns and small-quantity production, such instances that a large number of dresses of the same design are produced at once from a roll of textile are few. Accordingly, it is to be understood that the pattern-matching and cutting process using the taught data is not immediately performed in synchronism with the generation of the taught data, or in other words, the period for carrying cut the pattern-match and cutting process is different from the period for generating the taught data.

Figure 5:
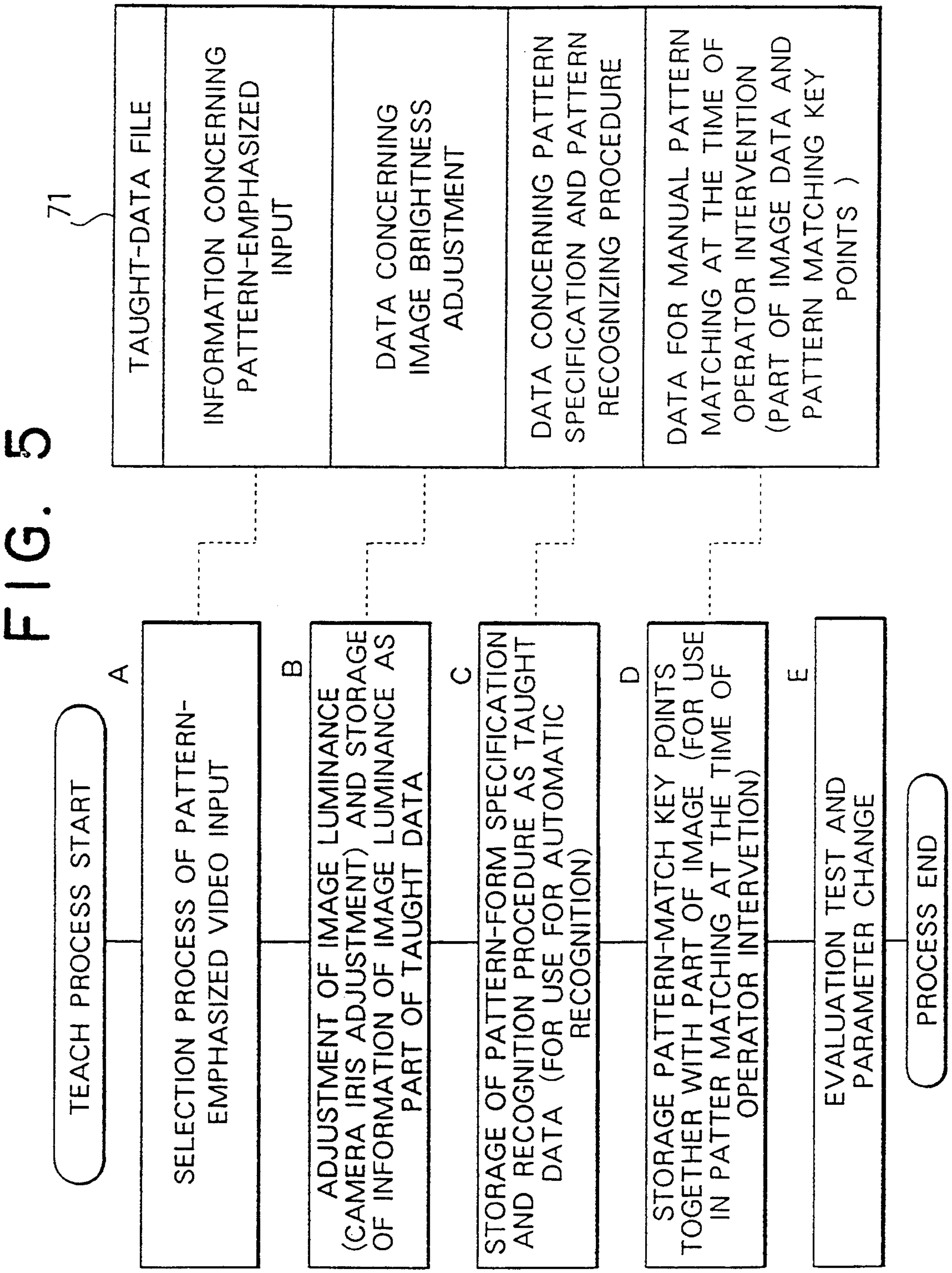
FIG. 5 is a flow chart showing the outline of the teaching process as one main process in the invention.

FIG. 5 shows the outline of the teaching process. The teaching process is a process for determining the specification of patterned cloth to be subjected to pattern matching and cutting and all of the procedures for pattern matching to store these data in the system. The teaching process starts after cloth 63 is put on the table 25 so that an image of cloth can be input through the camera 16. First, in the pattern-emphasized video input selection process (box A), the pattern form is stored as taught data by performing determination concerning the selection of a video signal for emphasis of the pattern form by paying attention to the point of view that patterns are generally formed of color yarn different from cloth. Then, in the image brightness control process (box B), various kinds of conditional values (for example, selection mode in brightness control) and parameters (for example, mean luminance value in mode D) are input as taught data by determining the brightness of the image optimum for recognition of a specific pattern form. In the process (box C) for determining the specification of the pattern form and the optimum recognition procedure, the specification of the pattern form and the optimum recognition procedure are determined and stored as taught data. In the pattern-matching key point storage process (box D), information to be collated with the positions of the teaching-time pattern-matching points by the operator (to display the pattern-matching key point as well as a part of the image having the pattern form) to perform pattern matching and cutting by using the taught data is generated and stored as a part of the taught data. In the evaluation test and parameter changing process (box E), parameters and the like are reset through performing tests for evaluating the recognition of the pattern form by using the result of the teaching. The details of the teaching process will be described hereunder with reference to FIGS. 6 through 15.

Figure 6:
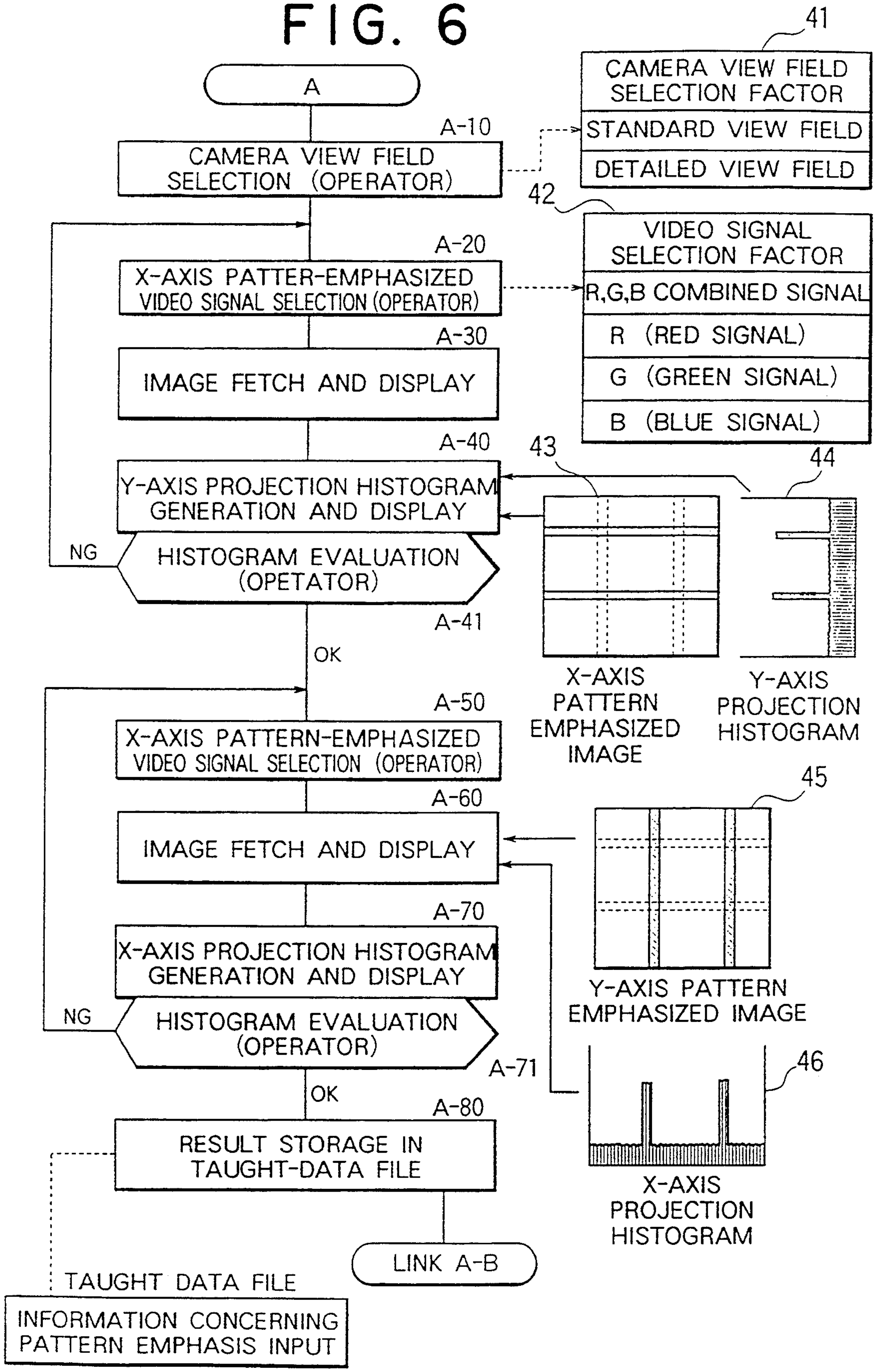
FIG. 6 shows the details of the pattern-emphasized video input selection process.
Figure 7:
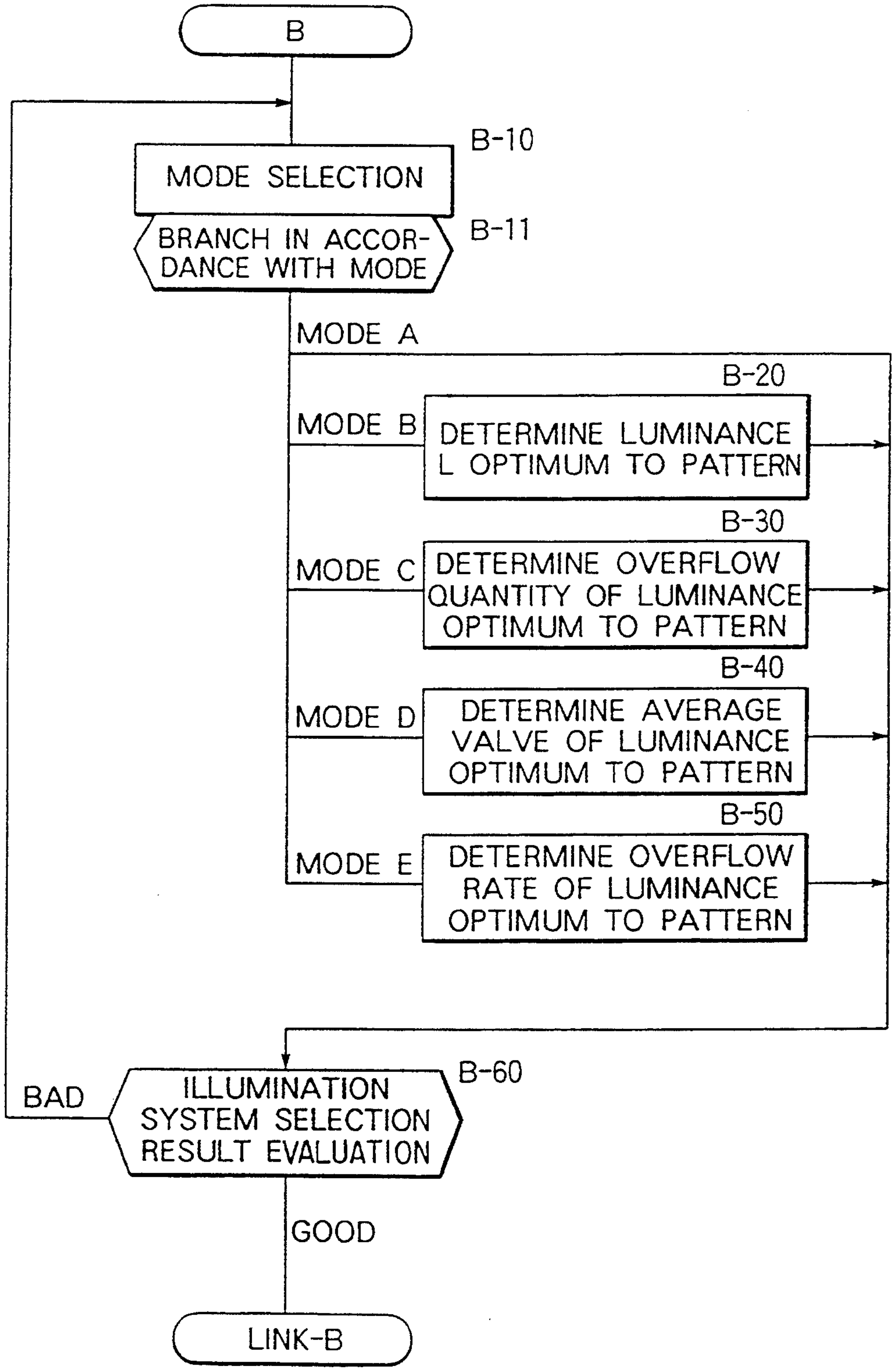
FIG. 7 is a flow chart showing the image brightness control process.
Figure 9:
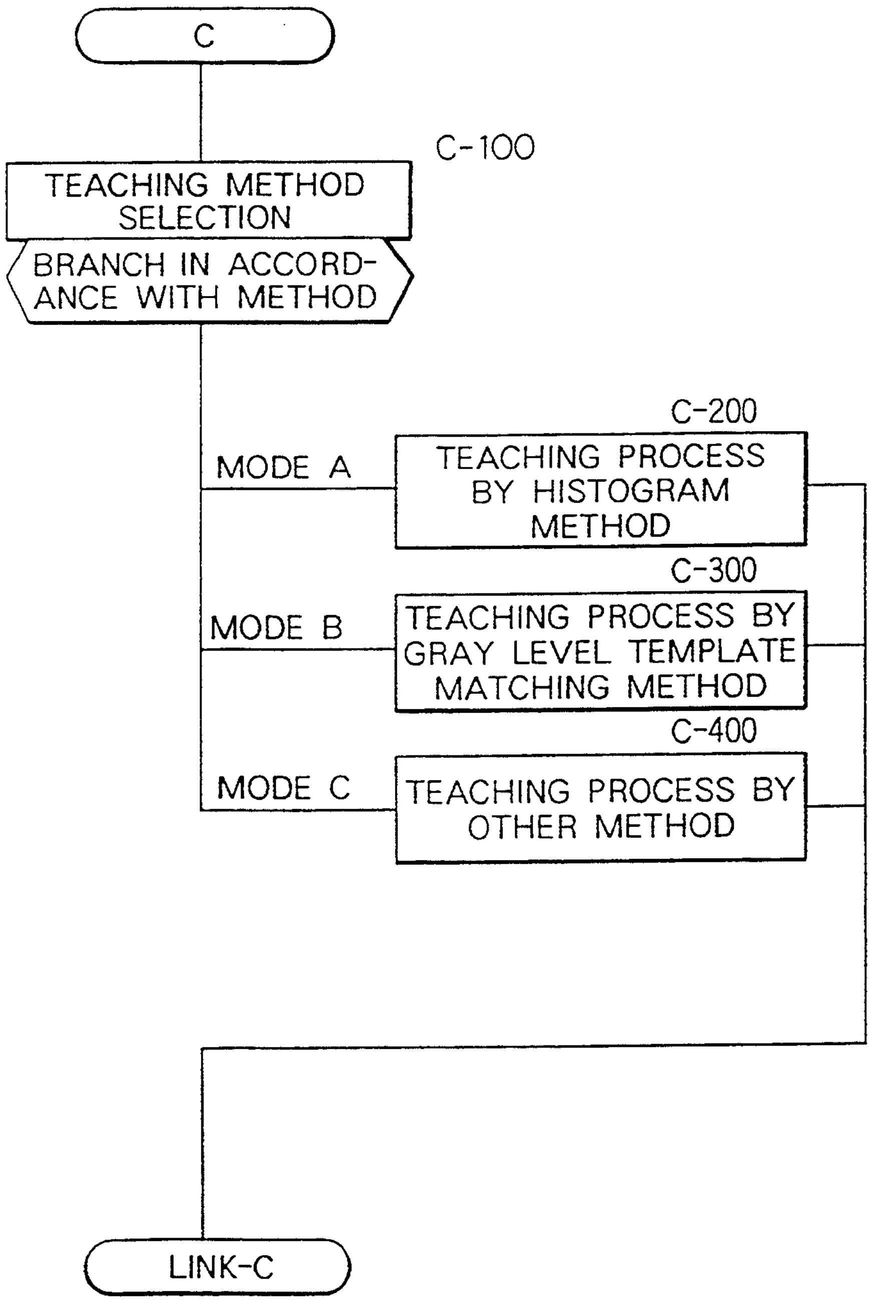
FIG. 9 is a flow chart showing the outline of the process for determining the specification of the pattern form and the recognition procedure.
Figure 10:
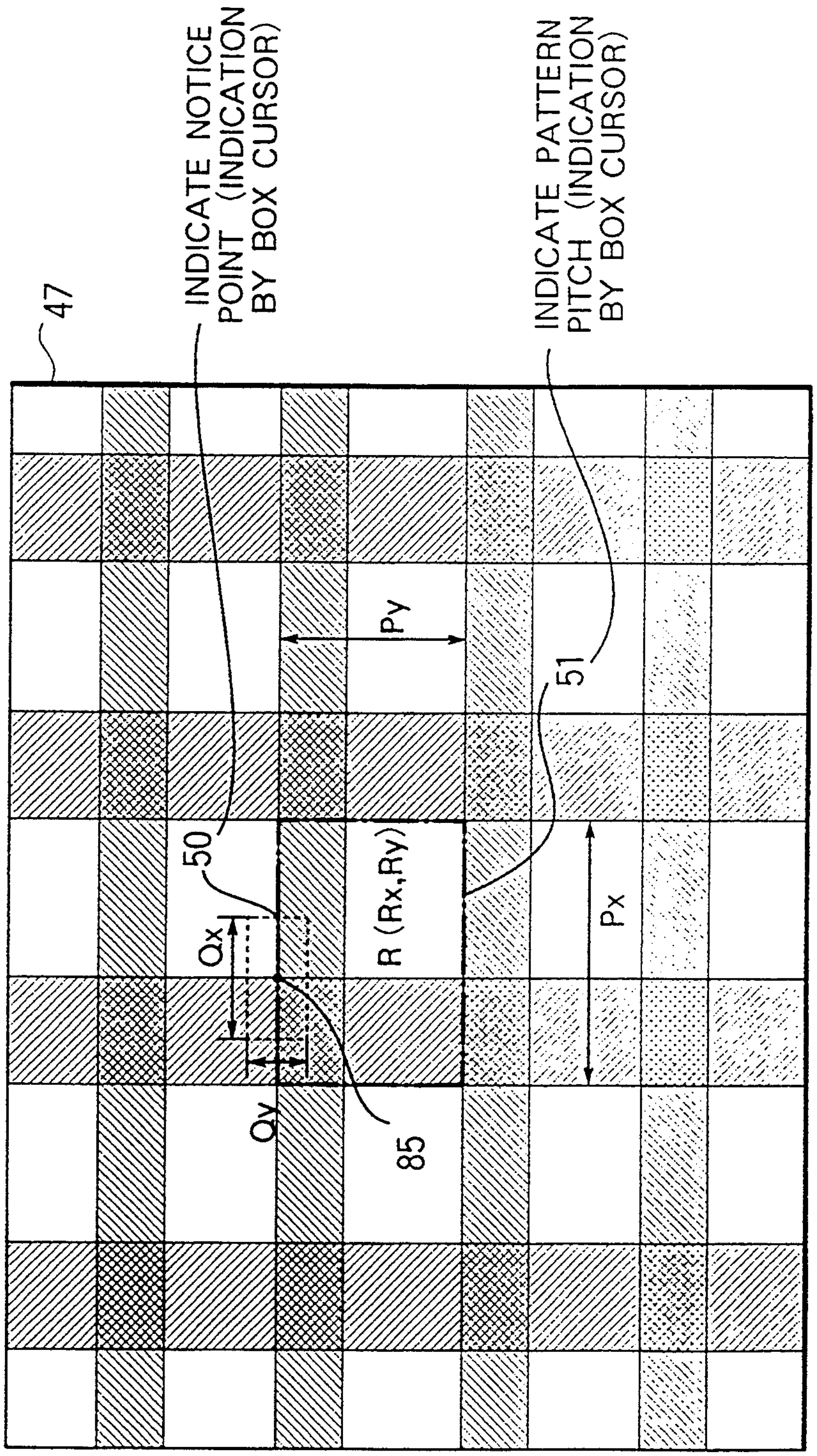
FIG. 10 shows an example of the teaching man-machine display.
Figure 11:
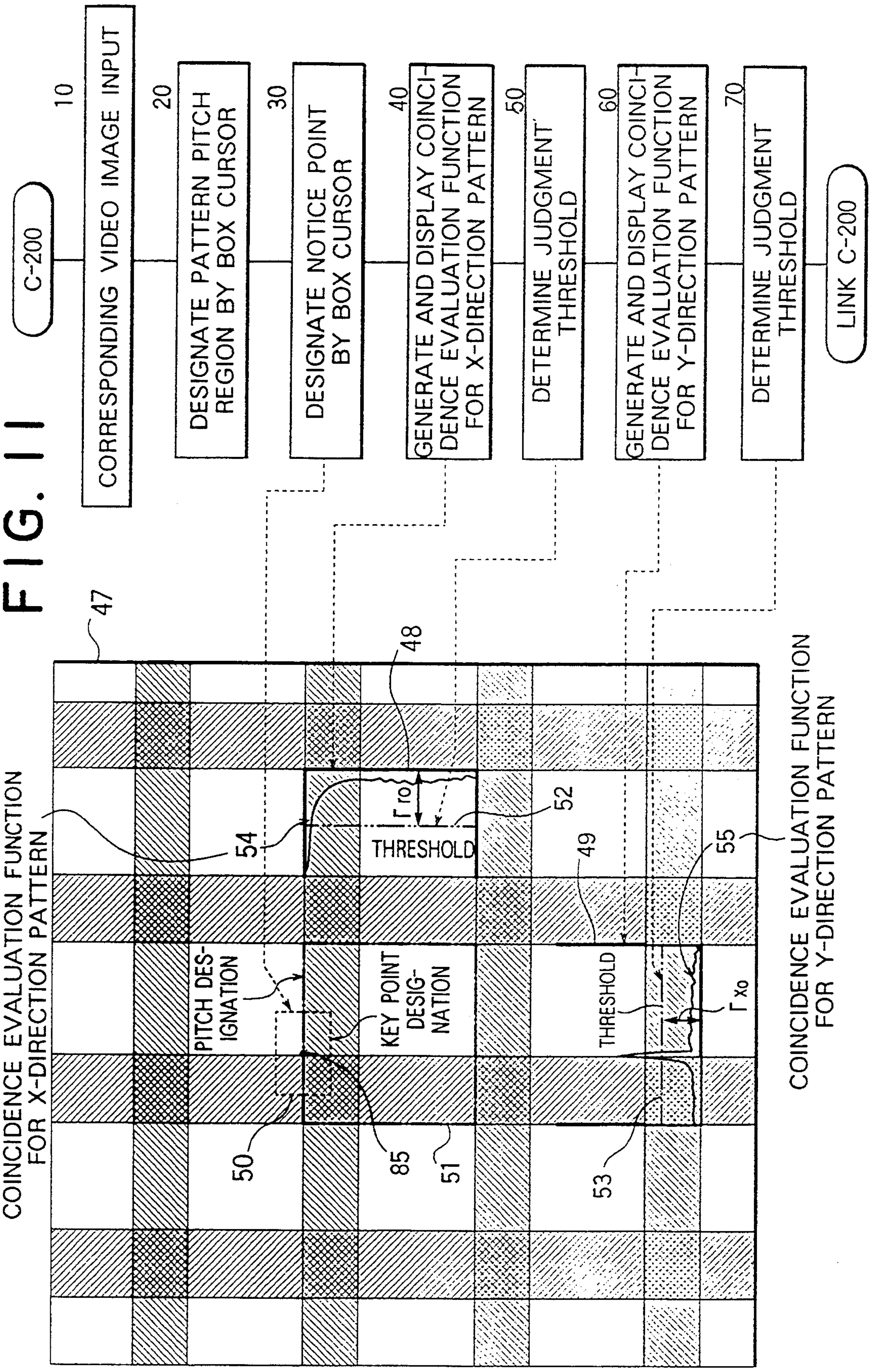
FIG. 11 shows the details of the teaching process using the histogram method.
Figure 12:
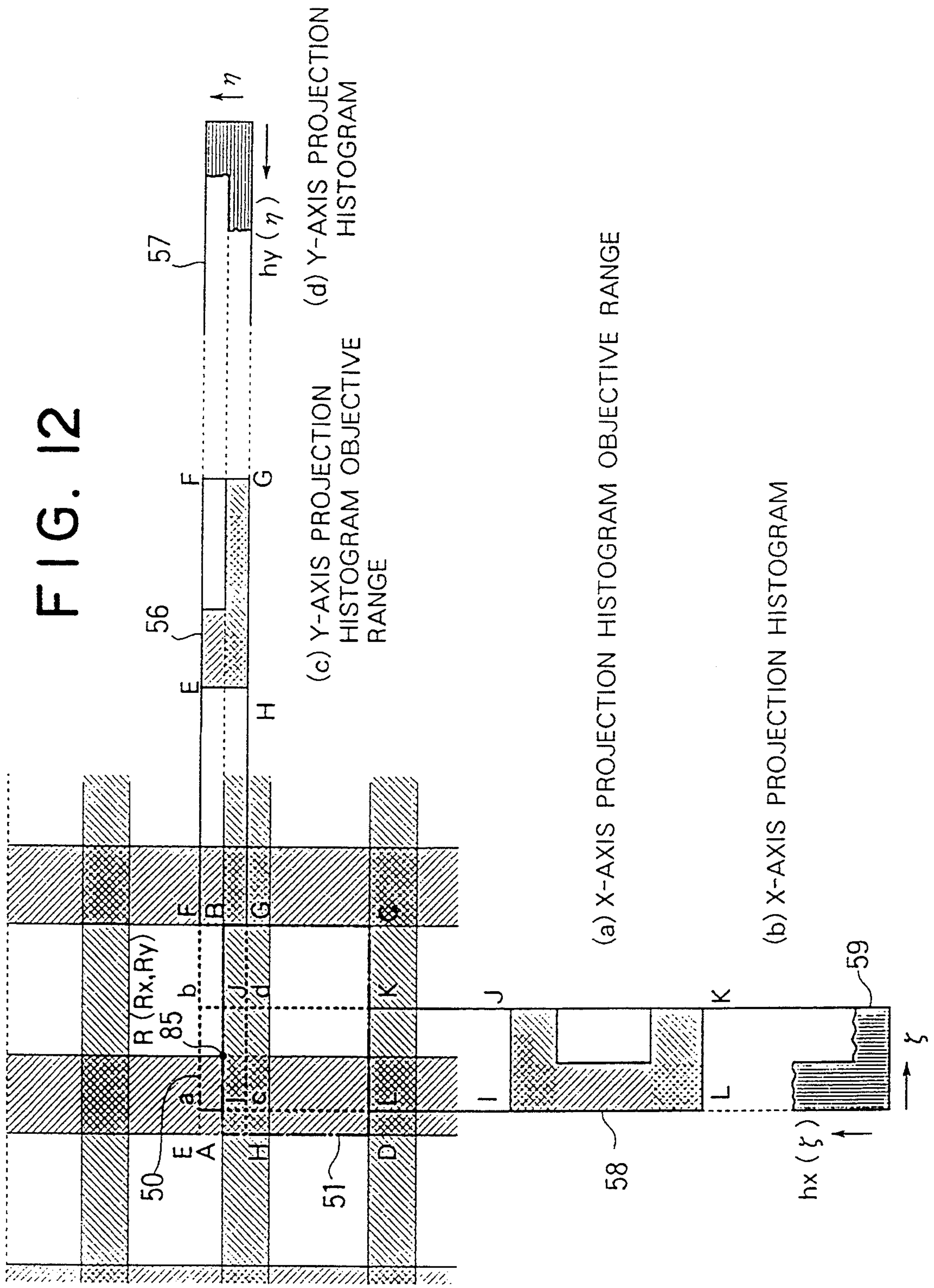
FIG. 12 shows an example of the generation of pattern data taught.
Figure 13:
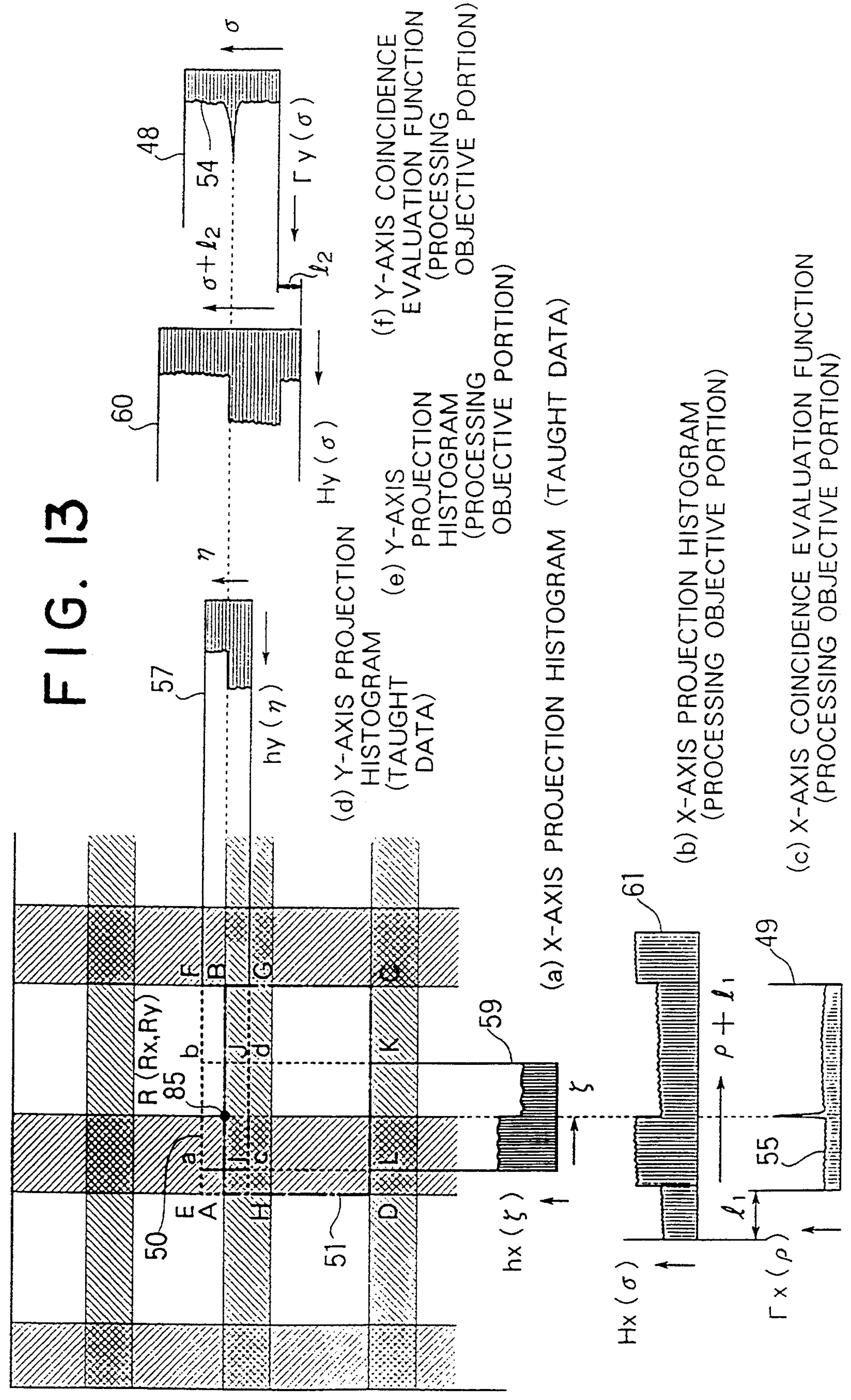
FIG. 13 shows an example of the generation of coincidence evaluation functions.
Figure 18:
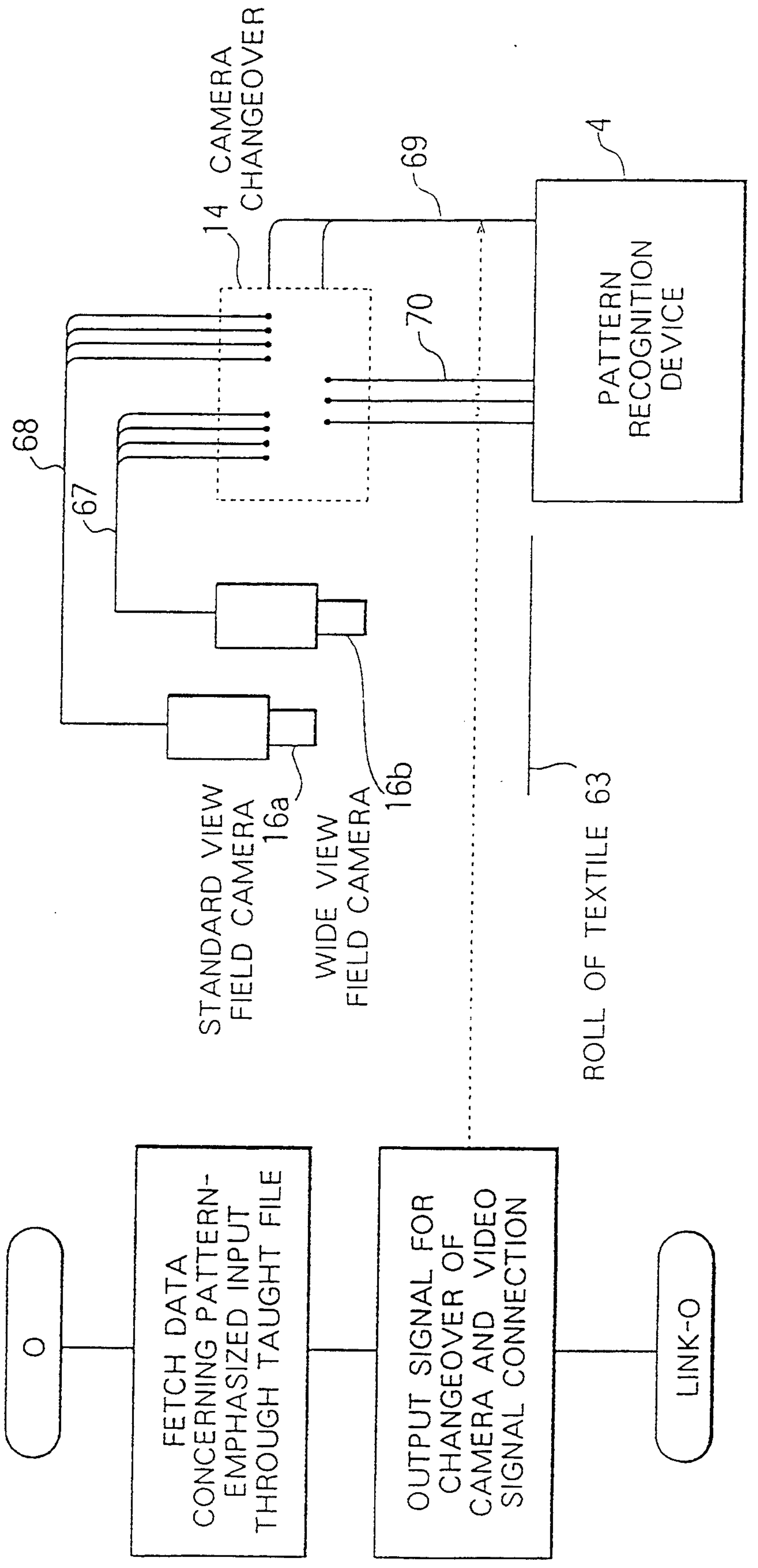
FIG. 18 shows the details of the camera and video signal changeover process.

FIG. 6 shows the details of the pattern-emphasized video input selection process (box A in FIG. 5). The camera view field selection process (A-10) is a process for determining the optimum camera view field on the basis of the density of the pattern form. In the case where a plurality of cameras having different view fields are provided (as shown in FIG. 18), the view field can be changed easily by switching the camera signals. As another method, the view field may be changed by changing the altitude of a camera and adjusting the focal length of the camera. Either method may be used. It is now assumed that the criterion for selection of the view field is experimentally determined on the basis of the size of the pattern pitch, the kind of the cloth and the density of the pattern form and that only the selection means is prepared in this device. The X-axis pattern-emphasized video signal process (boxes A-20–A-41) is a process for selecting a video signal to make it possible to emphasize X-directional patterns. The optimum video signal is selected through the changing-over of video signals, fetching an image, displaying the fetched image and histogram, and human judgment. Although color R, G, B and monochromatic signals are considered as selection factors in the case where a general purpose camera is used, video signals passing through filter-containing lenses are considered innumerably as specific selection factors. Also in the Y-directional pattern-emphasized signal selection process (boxes A-50–A-71), the optimum video signal is selected in the same manner as in the X-directional pattern-emphasized signal selection process. These results are stored as taught data expressing information concerning pattern-emphasis input. FIG. 7 shows the details of the image brightness control process (box B in FIG. 5). When the operator selects a mode for controlling the image brightness (box B-10), the flow branches according to the selected mode (box B-11) to determine the optimum condition in the mode. The optimum mode and condition are determined by evaluating the results of the selection (box B-60). An example of the image brightness selection system is shown in FIG. 8. The system shown by mode A is a system in which the maximum luminance portion on the display is adjusted to the maximum luminance (just before overflow) of the image memory. This mode is effective for the case where pattern recognition is performed using a broad range of information between the bright portion and the dark portion. In short, this mode is effective for complicated polychromatic checkered-patterns. Mode B shows a system in which the maximum luminance portion on the display is adjusted to a constant luminance value (the maximum representable value of the image memory, for example, given as a parameter not larger than 127). Mode C shows a system in which as overflow is given by opening the iris by a constant quantity (given as a parameter) after overflowing. Mode D shows a system in which the average luminance on the whole display is adjusted to a constant value (given as a parameter). Mode E shows a system in which the overflow rate is set to a constant value (given as a parameter). Any one of these modes can be employed optionally and, in most cases, based on the experimental rule. FIG. 9 shows the details of the process (box C) for determining the specification of the pattern form and the recognition procedure. In the drawing, a typical histogram method and a typical gray level pattern matching method are shown. If necessary, various kinds of other methods may be added thereto. The teaching process (C-200 in FIG. 9) using the histogram method will be described with reference to FIGS. 10 through 13. FIG. 10 shows an example of the display screen in the pattern teaching process. The operator used the mouse 13 (which may be replaced by digitizer, joy stick, track ball, etc.) to determine both a repeated pattern range and a notice point which is considered to be effective for pattern matching, on a pattern input screen 47 on the monitor television 12. The repeated pattern range is designated by generating a box cursor 51. The system stores the values of X- and Y-directional pitches Px and Py. Further, a pattern-match key point 85 is set. When the teaching of the pattern pitches, the notice point and the pattern-match key point is finished, the X-axis projection histogram and the Y-axis projection histogram in the neighbor of the notice point as shown in FIG. 12 are calculated and stored as taught data. In FIG. 12, the reference numerals 56 and 58 designate ranges in which the X- and Y-axis projection histograms are generated. Hereinafter, the X- and Y-axis projection histograms are respectively represented by functions $hx(\xi)$ and $hy(\eta)$ for further reference. Coincidence evaluation functions 54 and 55 are calculated by using the X- and Y-axis projection histograms and displayed on the man-machine screen 47 so as to be superposed thereon as shown in FIG. 11 (a graph 48 for determining the X-directional pattern threshold and a graph 49 for determining the X-directional pattern threshold). Limit values beyond recognition are determined through determining thresholds Γy0 and Γx0 by applying threshold determination cursors 52 and 53 to the coincidence functions. FIG. 13 shows an example of generation of such coincidence functions. In the drawing, (a) shows the X-axis projection histogram (represented by hx) of the taught data in the neighbor of the notice point, (b) shows the X-axis projection histogram (represented by Hx) of the target portion as a subject of the processing (that is, the inside portion surrounded by the box cursor of the pattern pitch or a slightly larger portion than the inside portion), and (c) shows the X-axis coincidence evaluation function (represented by Γx). The X-axis coincidence evaluation function 55 is calculated on the basis of the following expression:

$$\Gamma x(\rho) = \left[ AA0 - \sum_{i=0}^{i=px} \{Hx(\rho - l1 + i) - hx(i)\} \right] / AA0 \times 100 \quad (1)$$

in which:

Γx: X-axis coincidence evaluation function

Hx: X-axis projection histogram relative to the target portion as a subject of the processing hx: X-axis projection histogram relative to the neighbor of the notice point

AA0: constant

Also with respect to the Y axis, (d) shows the Y-axis projection histogram (represented by hy) of the taught data in the neighbor of the notice point, (e) shows the Y-axis projection histogram (represented by Hy) of the target portion as a subject of the processing (that is, the inside portion surrounded by the box cursor of the pattern pitch or a slightly larger portion than the inside portion), and (f) shows the Y-axis coincidence evaluation function(represented by Γy). The Y-axis coincidence evaluation function 54 is calculated on the basis of the following expression:

$$\Gamma y(\sigma) = \left[ BB0 - \sum_{i=0}^{i=py} \{Hy(\sigma - 12 + 1) - hy(i)\} \right] / BB0 \times 100 \quad (2)$$

in which:

Γy: Y-axis coincidence evaluation function

Hy: Y-axis projection histogram relative to the target portion as a subject of the processing hy: Y-axis projection histogram relative to the neighbor of the notice point

BB0: constant

Figure 14:
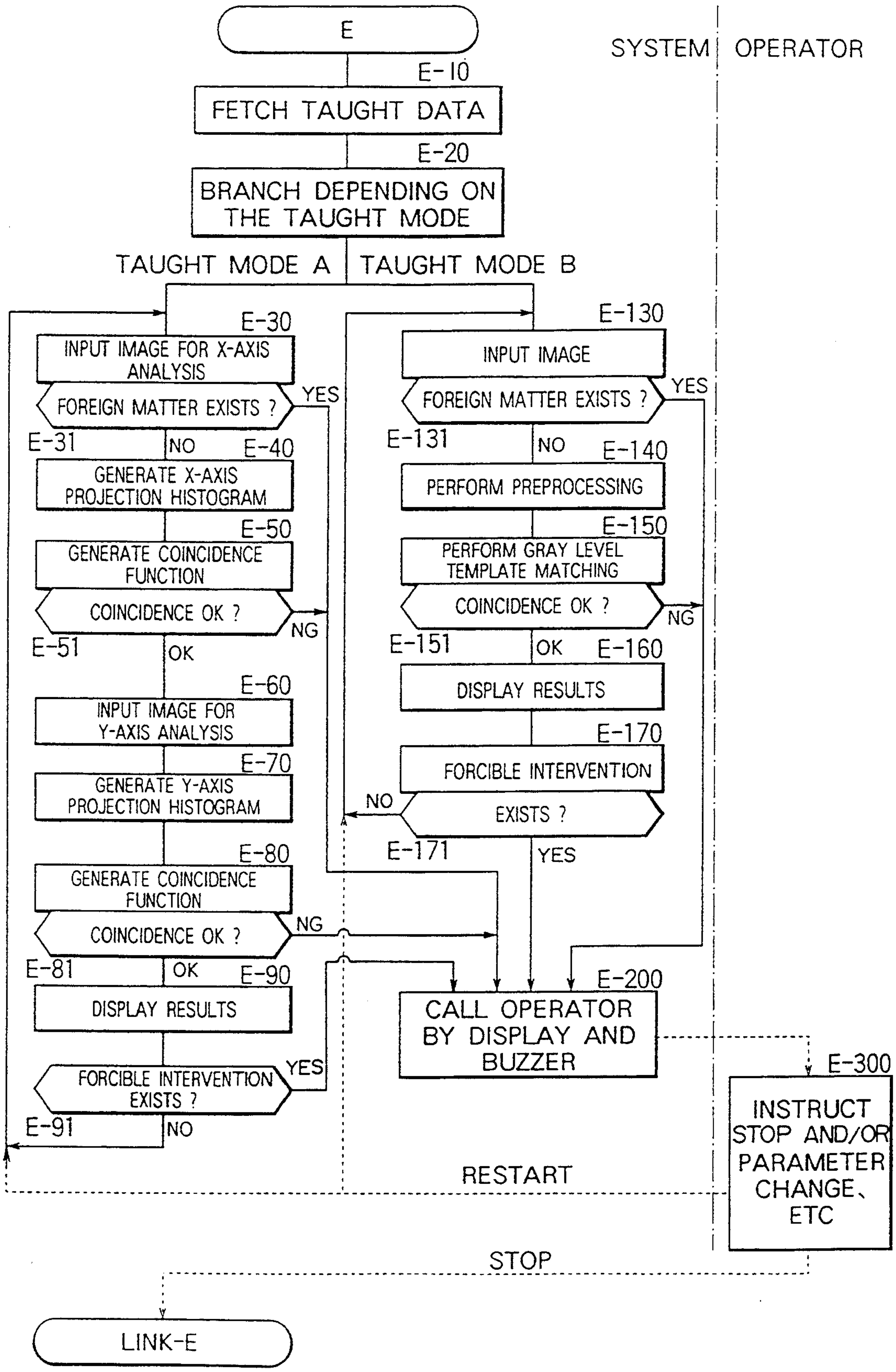
FIG. 14 is a flow chart showing the evaluation test and parameter changing process.

FIG. 14 shows the details of the evaluation test and parameter changing process (box E in FIG. 5). Recognition tests are repeatedly performed while the subject of the pattern form on the cloth is successively replaced by a new one, so that various kinds of conditions set at the time of the teaching are examined to perform correction if the condition is unsuitable. The process will be described hereunder relative to the teaching mode A. First, an image for X-axis analysis (Y-directional patterns) is input to check the presence of foreign matter except the cloth. The checking of foreign matter can be made easily on the basis of the luminance level evaluation. In the case where foreign matter is detected, the operator 40 is called to restart the process after checking. Then, the X- and Y-axis projection histograms of the target portion to be processed are generated. Further, the coincidence evaluation functions are calculated to judge whether or not the maximum portion is not smaller than the threshold. When the coincidence evaluation expresses that the recognition is impossible, the operator is called to restart the process after performing parameter changing or the like. The optimum parameter can be set by repeating the aforementioned procedure.

Figure 15:
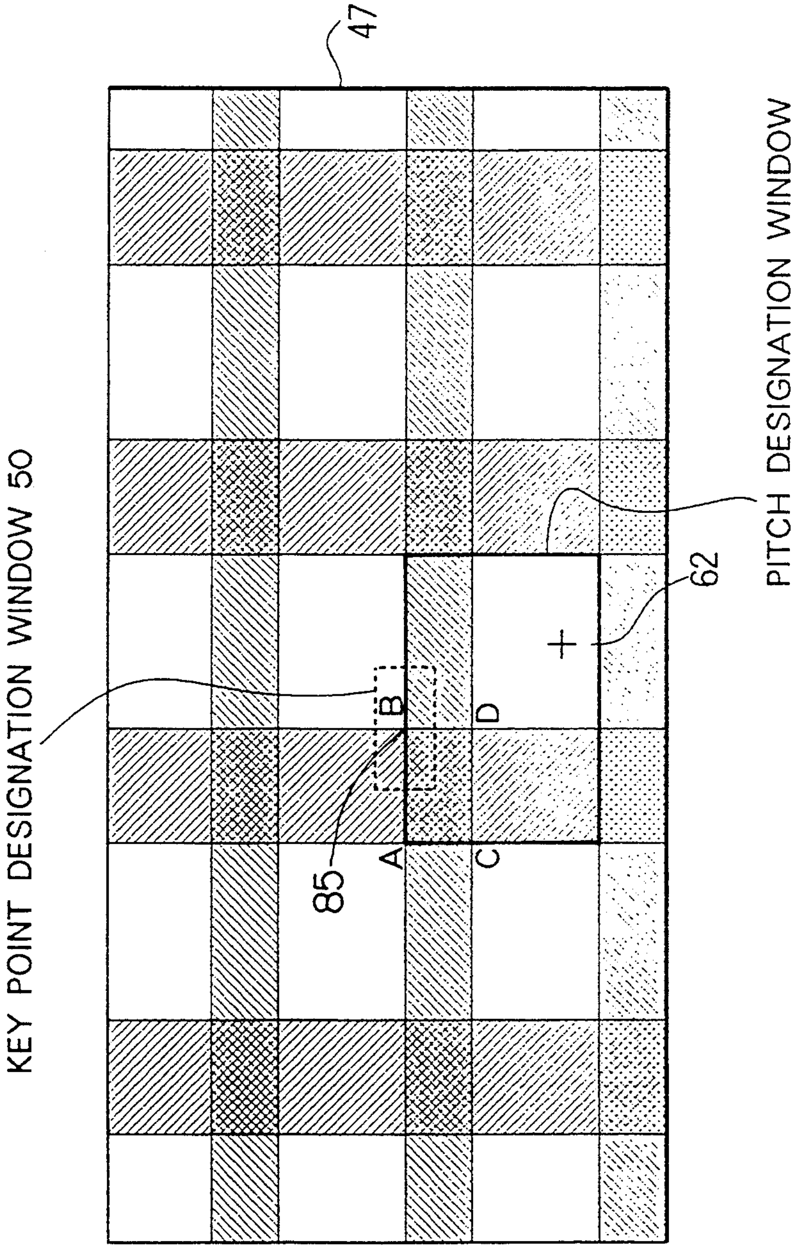
FIG. 15 shows the method for determining the pattern-matching key point.

FIG. 15 shows a method for determining the pattern-match key point 85. In the drawing, the reference numeral 47 designates a display screen and 50 a feature point indicating window. In the case where pattern matching is to be performed manually, the pattern-matching key point 85 is used. In the drawing, each of points A, B, C and D is considered to be most effective. Any one of these points is designated by operating the + cursor 62 through the mouse. In the internal processing in this device, the pattern-matching key point 85 is set so as to coincide with the automatic positioning pattern position (that is, the relations between the relative positions of the pattern-match key point and the feature point used for automatic pattern matching are calculated). Accordingly, there is no problem even if the automatic positioning and the manual positioning are mixed in one process. The pattern-matching key point 85 is used for the manual pattern matching and also for displaying the result of the automatic pattern matching.

The real pattern matching process using the taught data will be described hereunder with reference to FIG. 16. When cloth 63 is put on the table 26 and then the start button of the control panel 3 is depressed, this device starts. The pattern-match control computer 2 issues an origin position measurement request to the pattern recognition device 4 (box D). In the inside of the pattern recognition device, the camera video signal is changed over on the basis of the taught data (box O). Further, iris control is performed on the basis of the taught data (box P). The pattern form as a part of the taught data and the pattern-matching key point 85 (expressed by the symbol + or the like) are displayed so as to be superposed (box T). Then, the pattern origin is determined through operating the mouse after fetching an image through the camera (box U). When the position of the origin is received (box E), the pattern-match control computer issues a request to move the robot (box H) and measure the pattern position (box I) for each pattern-match point. When the result of the pattern position is then received (box J), checking of the pattern position is performed (box K). When the pattern position is poor, the recognition is regarded as erroneous-recognition to issue an operator intervention request to the pattern recognition device for the purpose of pattern matching (box L). When a normal pattern position is received, the pattern position is calculated on the basis of the received data (box M). The process is finished by applying the aforementioned procedure to all pattern-matching points. In the case where the pattern recognition device cannot perform normal pattern recognition by automatic pattern position measurement, operator intervention (box R) is initiated. An example of algorithm for judgment of erroneous-recognition is expressed by the following expressions:

$$|\Delta x - \Delta X| > \epsilon \quad (3)$$

$$|\Delta y - \Delta Y| > \epsilon \quad (4)$$

in which:

$$\Delta x = x(i) - x(i-1)$$

$$\Delta y = y(i) - y(i-1)$$

$$\Delta X = X(i) - X(i-1)$$

$$\Delta Y = Y(i) - Y(i-1)$$

| | |
|---|---|
| {(x(i),y(i)}: | Coordinates of the present pattern-matching point of CAD |
| {(x(i−1),y(i−1)}: | Coordinates of the preceding pattern-matching point on CAD |
| {(X(i),Y(i)}: | Coordinates of the present pattern-matching point on cloth |
| {(X(i−1),Y(i−1)}: | Coordinates of the preceding pattern-matching point on cloth |
| ε: | Pattern-matching allowable error quantity |

When the expression 3 or the expression 4 is valid, the recognition is regarded as erroneous-recognition. The pattern-matching allowable quantity is determined experimentally according to the kind of the textile and the specification of the pattern form.

Figure 17:
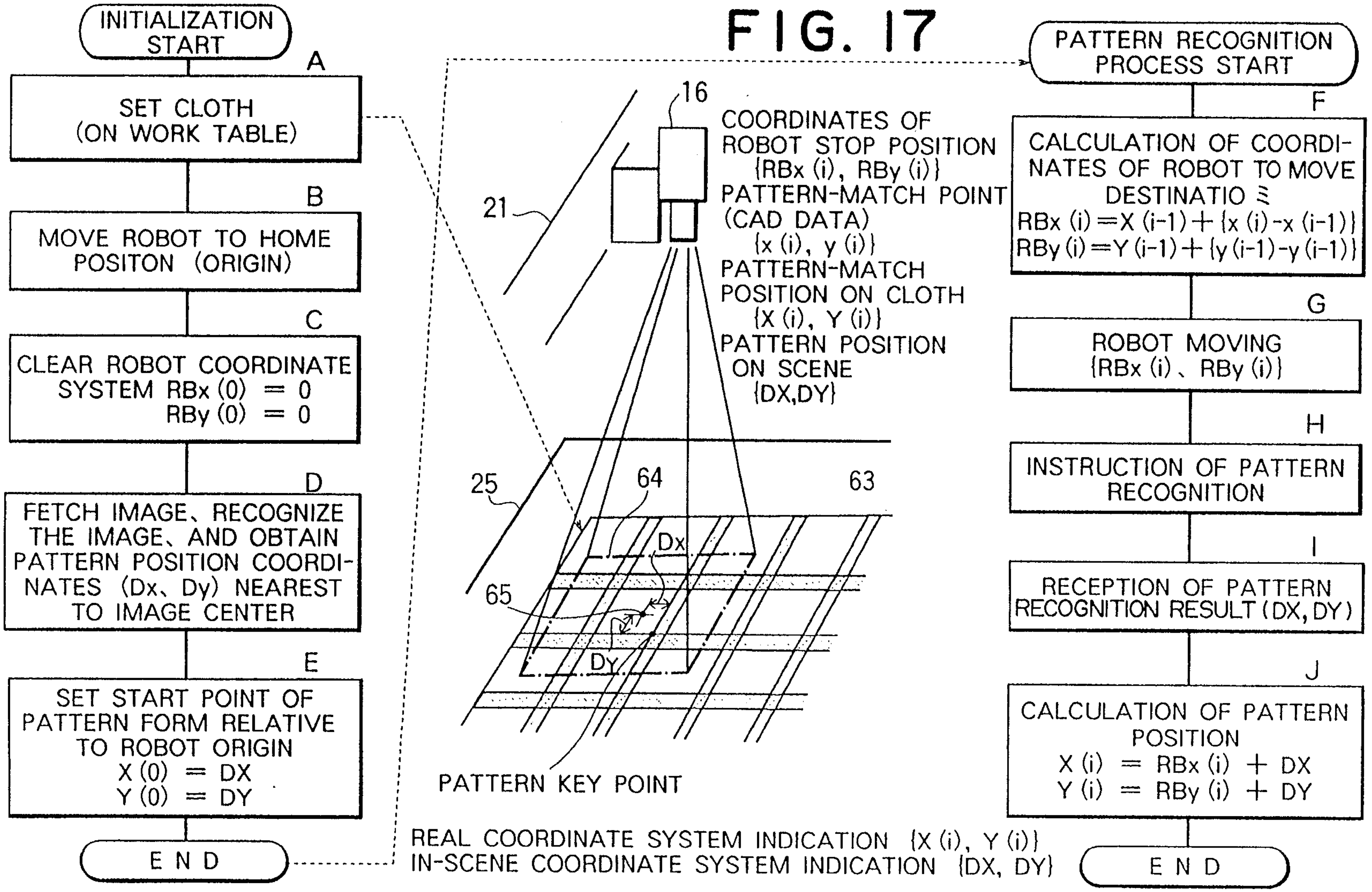
FIG. 17 shows the robot control method optimum to automatic matching.

FIG. 17 shows a camera moving robot control method optimum for automatic pattern recognition. The camera moves to the vicinity of each of the pattern-matching points. When the camera is moved above the pattern-matching point on the CAD data, the pattern position of the textile may go far away from the camera to make pattern recognition difficult. Therefore, the pattern position is always placed so as to be adjusted to the center of the camera. Therefore, the destination to which the robot moves is set to the values calculated by the following expressions:

*X* ordinate $$RBx(i) = X(i-1) + \{x(i) - x(i-1)\} \quad (5)$$

*Y* Ordinate $$RBy(i) = Y(i-1) + \{y(i) - y(i-1)\} \quad (6)$$

in which:

| | |
|---|---|
| {(x(i−1),y(i−1)}: | Pattern position on cloth at the preceding process |
| {(x(i−1),y(i−1)}: | Coordinates of the pattern-matching point on CAD at the preceding process |
| {(x(i),y(i)}: | Coordinates of the present pattern-matching point on CAD |

When the data received as the result of the pattern recognition is expressed by distance from scene center (DX, DY), the pattern position on cloth is calculated by the following expressions:

$$X(i) = RBx(i) + DX \quad (7)$$

$$Y(i) = RBy(i) + DY \quad (8)$$

By the aforementioned method, the notice point can be taken in the center of the screen, so that the recognition rate can be improved.

Figure 16:
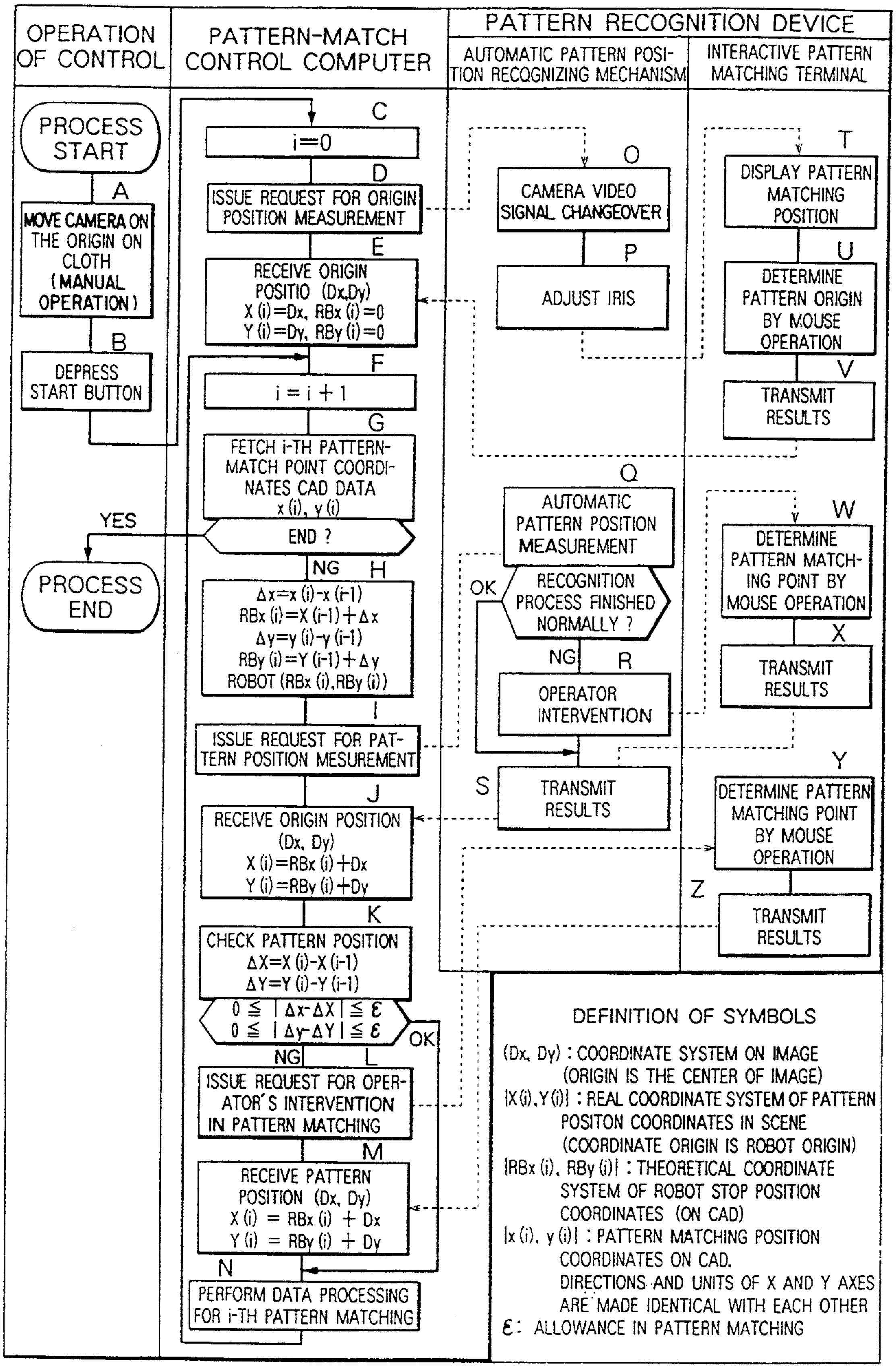
FIG. 16 is a flow chart showing the procedure in the pattern matching process as another main process in the invention.

FIG. 18 shows the details of the camera and video signal changeover process (box O in FIG. 16). The camera changeover switch 14 is controlled on the basis of a changeover signal 69. In the drawing, there is shown the case where two cameras constituted by a standard view field camera **16*a* and a narrow view field camera 16*b*** are provided. The changing-over between the two cameras is performed as occasion demands. Each of the cameras outputs color (R, G, B) and monochromatic (composite) signals. The selection of these signals is performed simultaneously.

Figure 19:
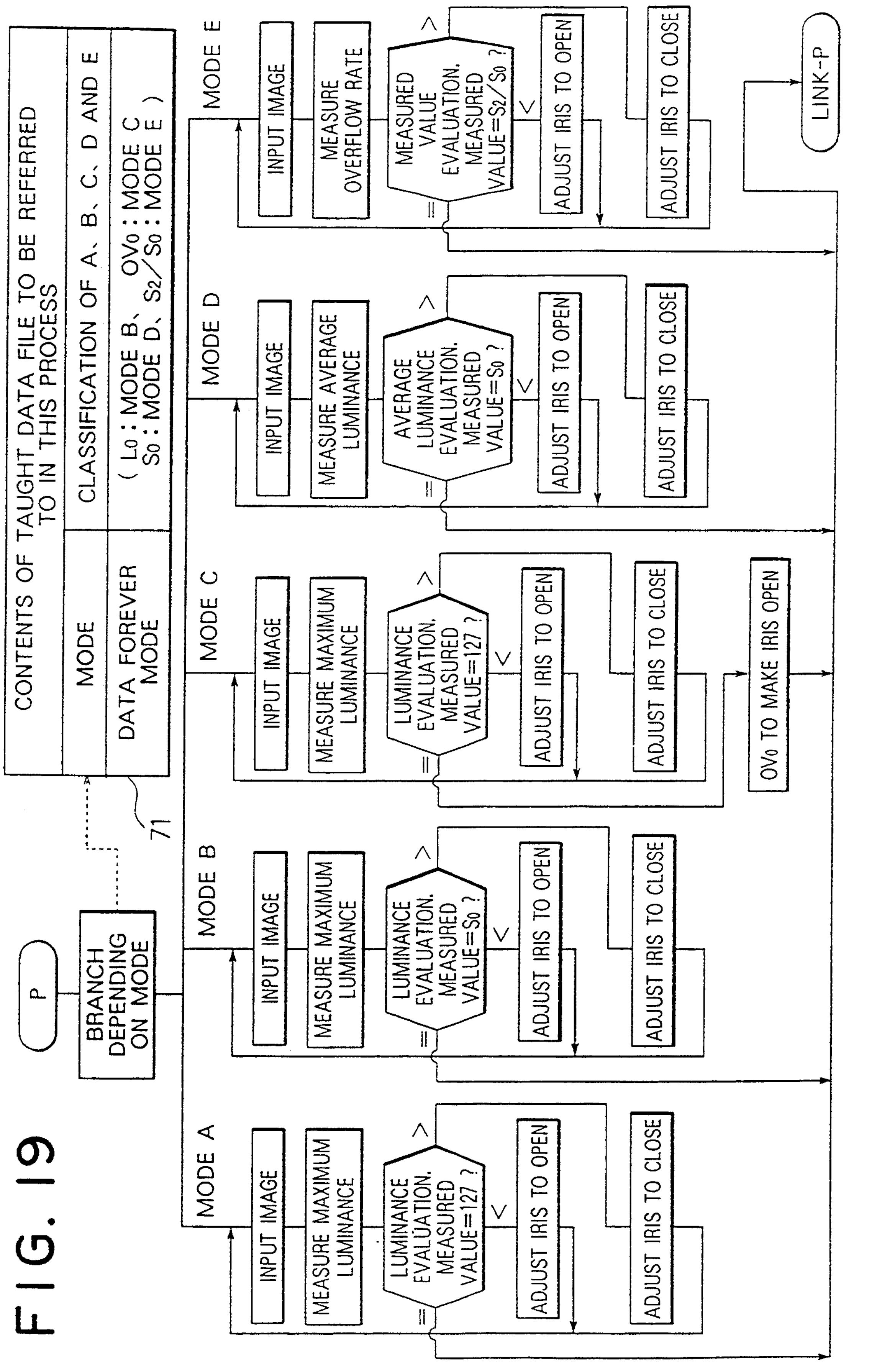
FIG. 19 shows the details of the iris control process.

FIG. 19 shows the details of the iris control process (box P in FIG. 16). Because the mode is determined at the time of the teaching, the iris is controlled to optimum brightness on the basis of the mode.

Figure 20:
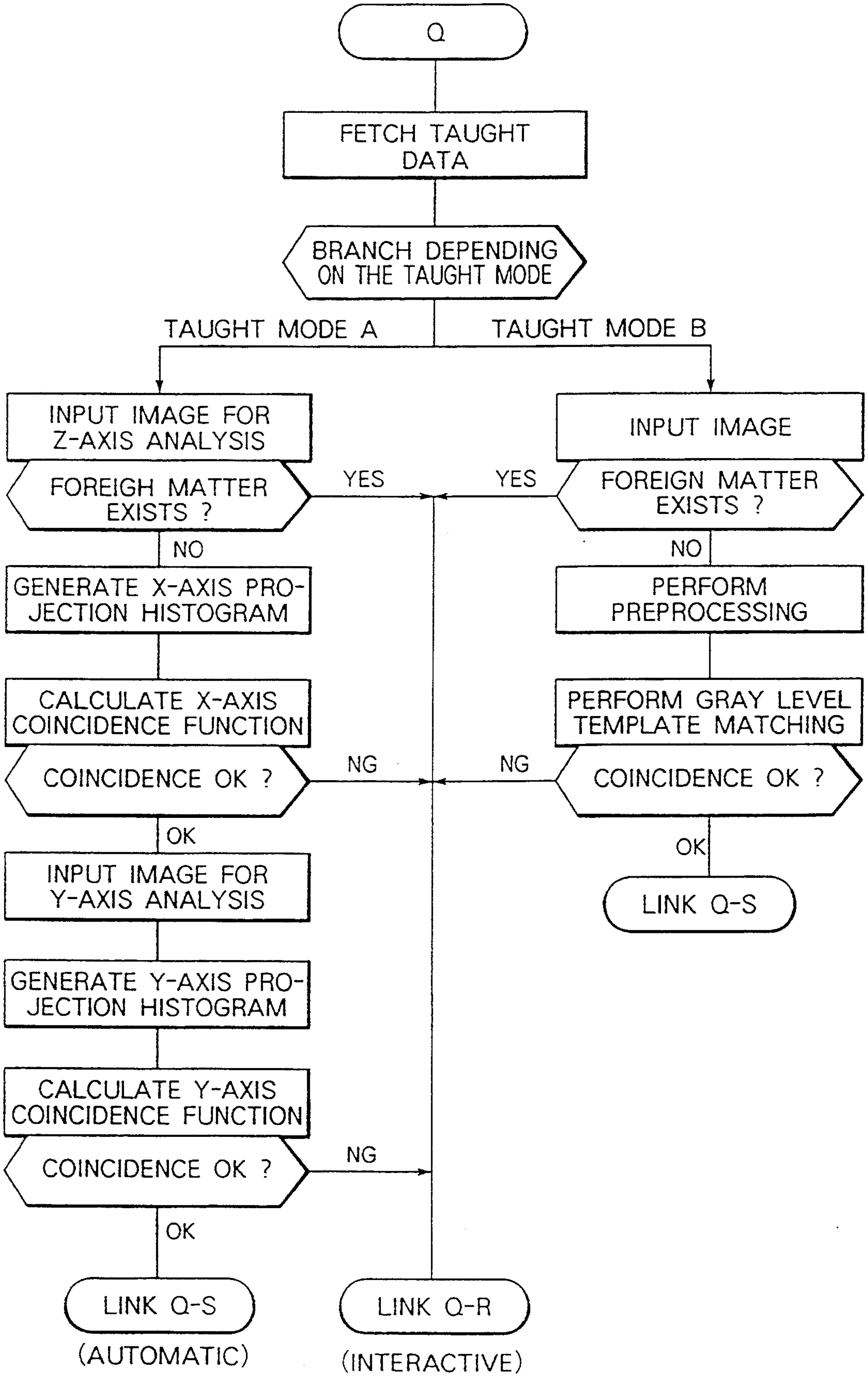
FIG. 20 is a flow chart showing the contents of the pattern position automatic measuring process.

FIG. 20 shows the details of the automatic pattern position measuring process (box Q in FIG. 16). When the result of the foreign matter checking or the result of the coincidence evaluation at the time of the inputting of an image is poor, the operator intervention process is required. By the process, the pattern matching work can be continued through the manual operation by the operator without any problem even if poor recognition for delicate patterns occurs. In the drawing, an affirmative "OK" of the coincidence evaluation expresses that the patterns can be recognized, and "NG" expresses that the patterns cannot be recognized. The detection of the poor recognition is performed by comparing the maximum values of the coincidence functions with the thresholds Γxo and Γyo. When the condition of the following expression is valid, the pattern recognition is regarded as poor recognition.

$$\mathrm{Max}\{\Gamma x(\rho)\} \leqq \Gamma xo,$$

or $$\mathrm{Max}\{\Gamma y(\rho)\} \leqq \Gamma yo \quad (9)$$

Figure 21:
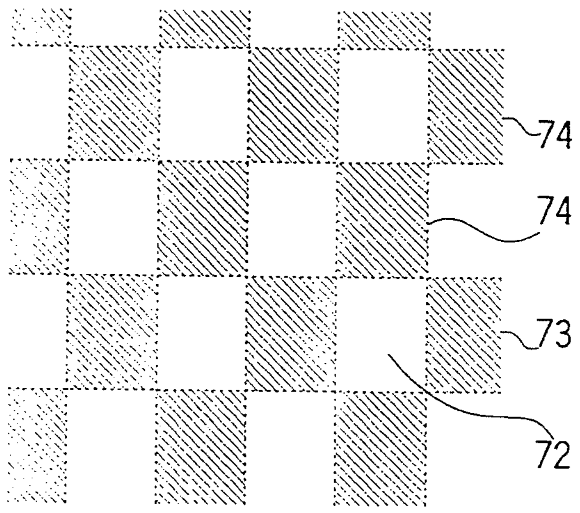
FIG. 21 shows an example of a patterned textile in which yarn formed by adding a special medium is woven into the basis portion of the textile to make pattern recognition easy.
Figure 22:
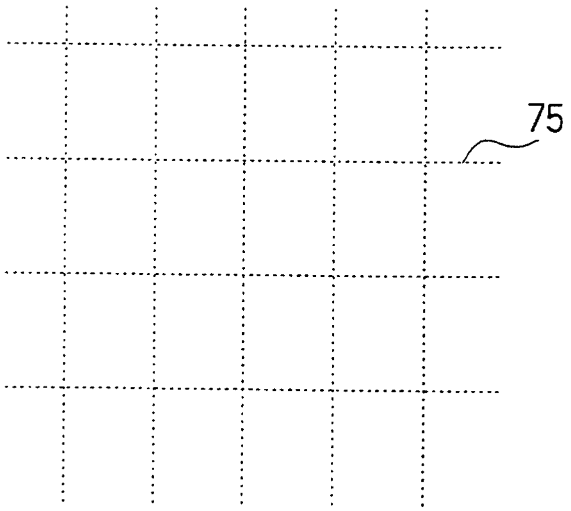
FIG. 22 shows an example in which an image of patterns of the aforementioned special structure is fetched under a special light source.
Figure 23:
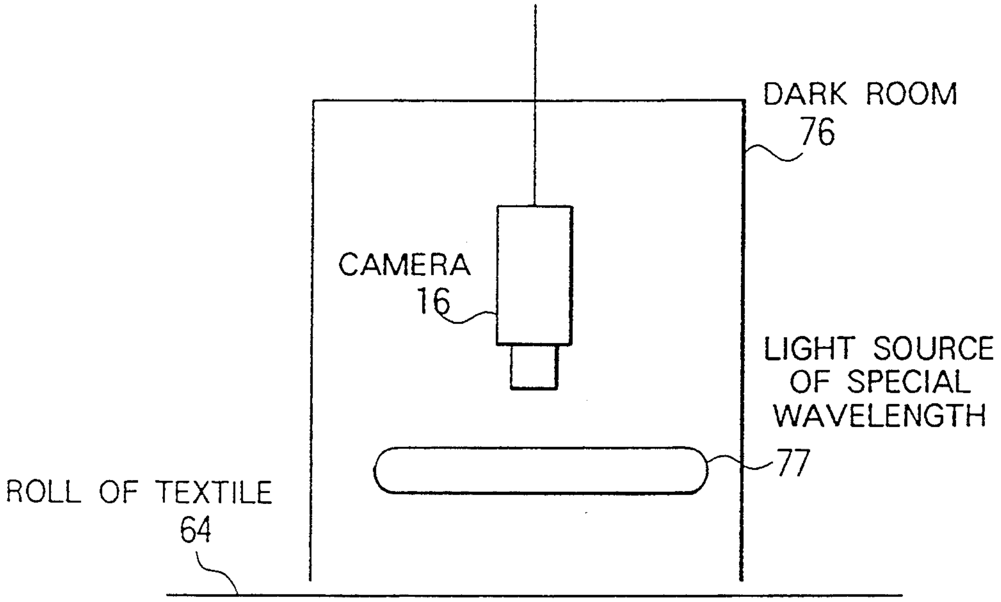
FIG. 23 shows an example of the camera image fetching mechanism for recognizing the patterns of the special structure.

FIG. 21 shows an example of cloth in which yarn formed by adding a special medium thereto is woven into the pattern boundary portions to make pattern recognition easy. The reference numeral 72 designates a plain portion of cloth and 73 a pattern portion. The pattern portion is different from the plain portion in weaving method but is the same in yarn as the material and color. It is considered that pattern matching of such patterns by image processing is of great difficulty. Although it is very difficult to recognize image patterns because yarn materials are the same, patterns can be easily automatically recognized by the image processor because the yarn 74 is formed by weaving the special medium into the pattern boundary portions. The special medium used is a chemical material which is invisible to human eyes under a general light source but is recognizable as an image under a special light source. Fluorescent absorbent, fluorescent bleach, or the like, is effective as the special medium. Under the special light source, only the fluorescent portion 75 of yarn woven into the boundary portion as shown in FIG. 22 is recognized as an image. Preferably, a dark room 76 having such a structure as shown in FIG. 23 and a special wavelength light source 77 may be prepared. The dark room and the light source as well as the camera are provided in the robot. By this method, the recognition rate for delicate patterns can be improved without influence on the design of patterns. Automatic delicate pattern matching which has been heretofore impossible can be made, so that efficient production can be made in the same manner as in the case of plain cloth.

Figure 24:
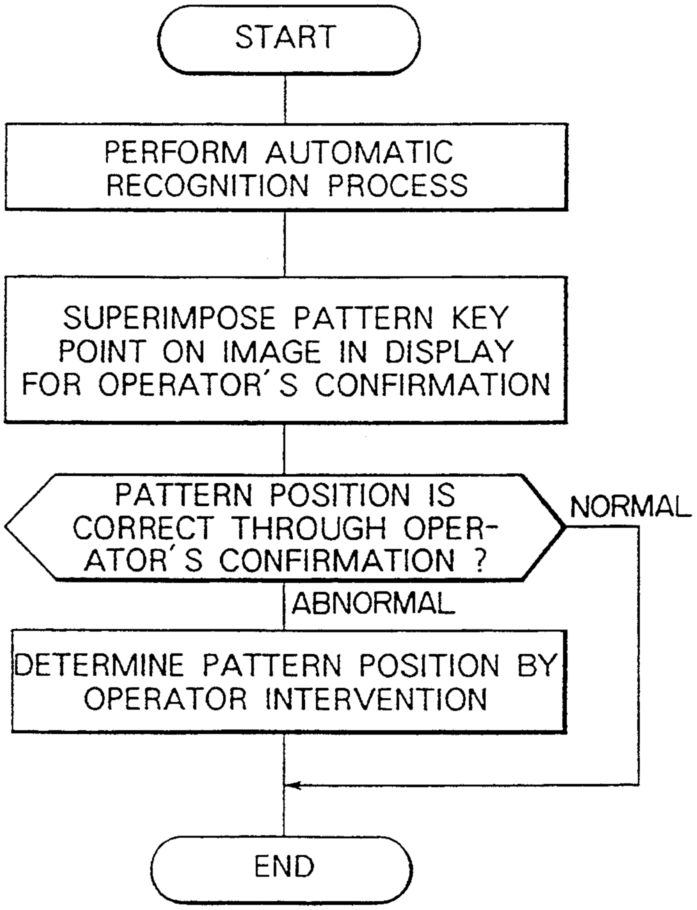
FIG. 24 shows an example of the procedure in the method in which erroneous-recognition is checked just after pattern matching.
Figure 25:
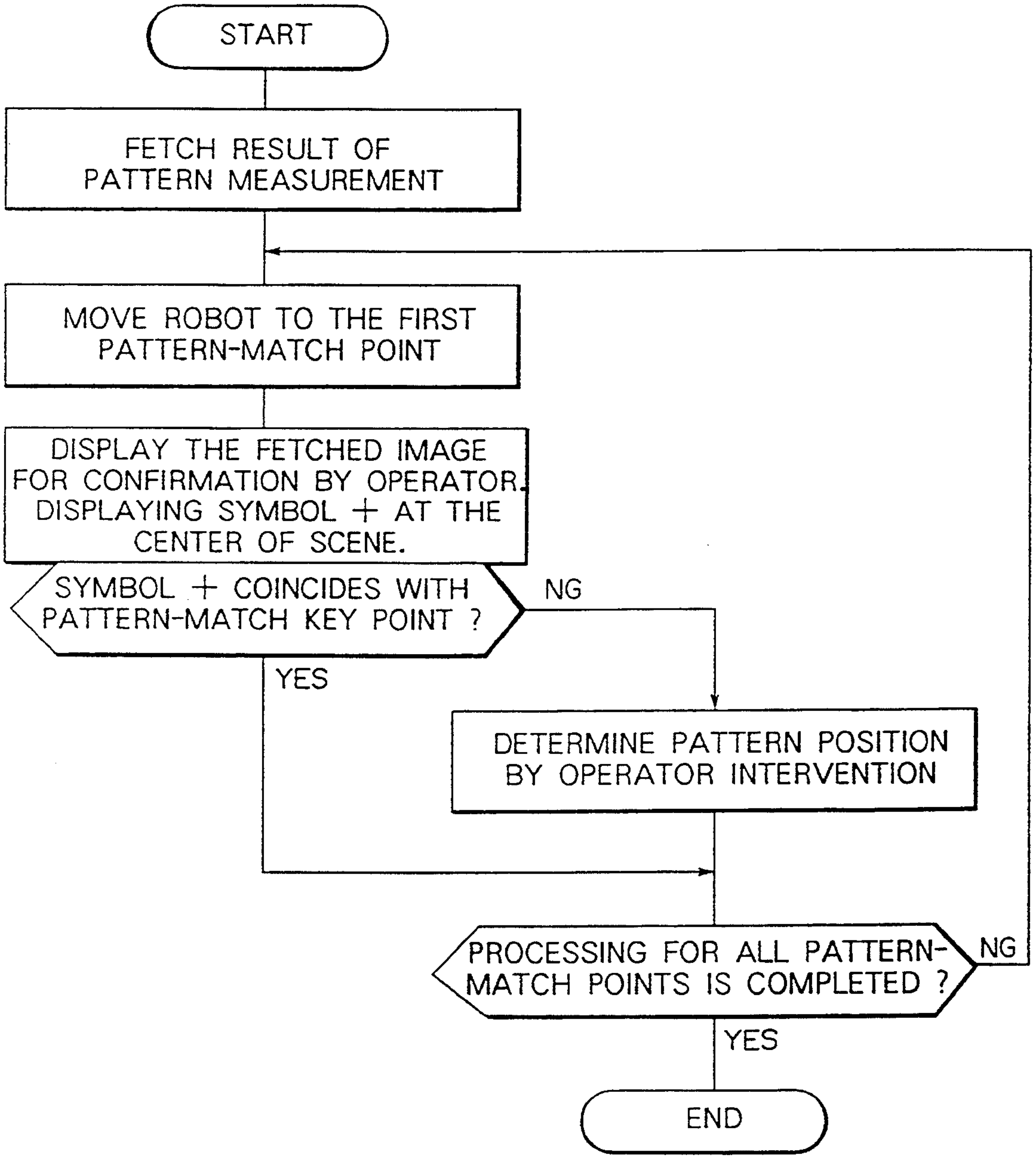
FIG. 25 shows an example of the procedure in which erroneous-recognition is checked after all the pattern matching process is finished.

A process for correcting the pattern matching through detecting erroneous-recognition before cutting even in the case where such erroneous-recognition occurs at the time of pattern matching is essential to the automating pattern-matching and cutting. As a method for detecting erroneous-recognition, the method in which the operator performs checking for each pattern-matching point just after the automatic recognition process is shown in the flow chart of FIG. 24. As another method, the method in which collective checking is performed after the completion of the automatic pattern measurement is shown in the flow chart of FIG. 25. It is to be understood through application of the erroneous-recognition checking method that this method is more effective and more advantageous than the perfect interactive method.

Figure 26:
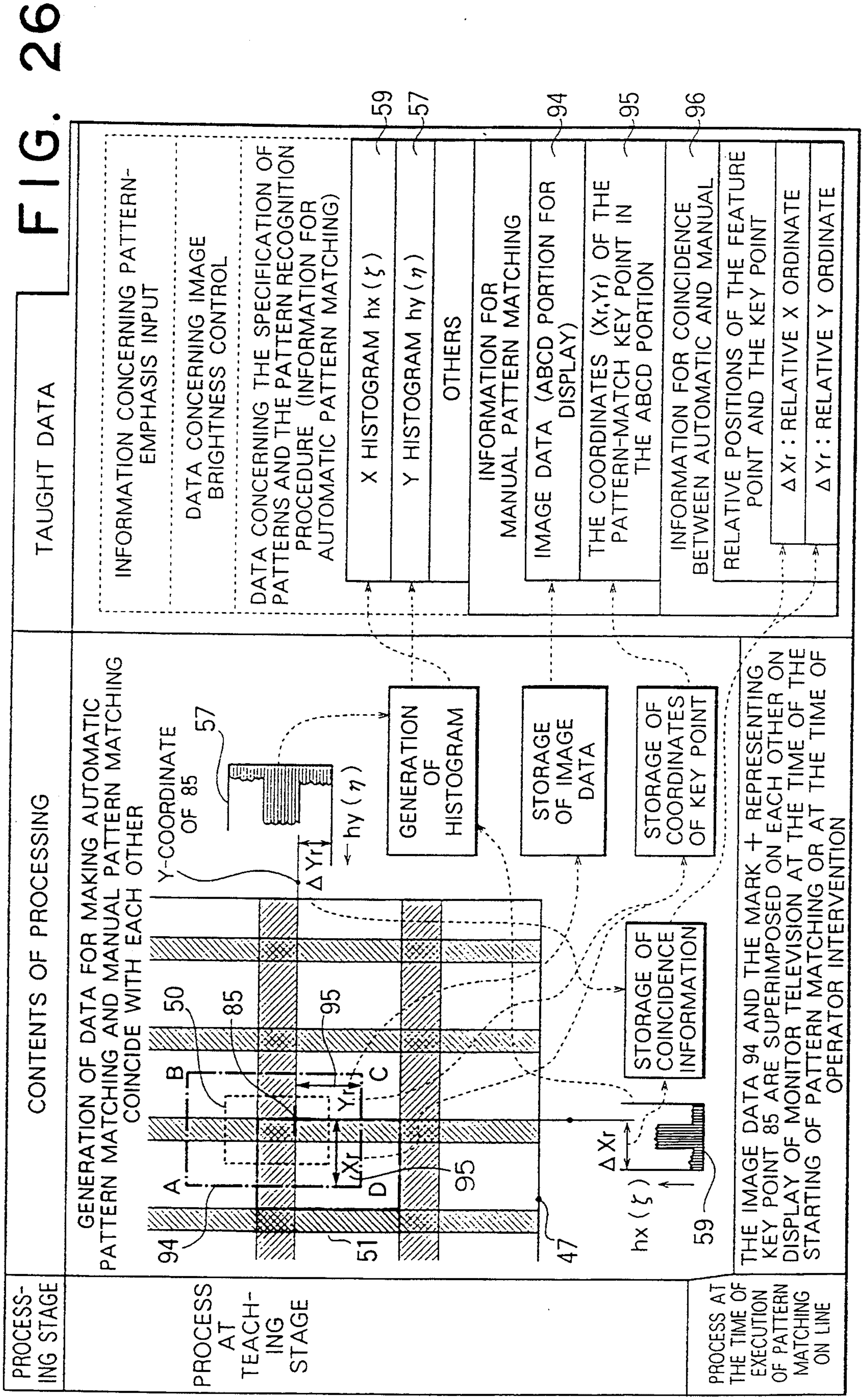
FIG. 26 shows the process for changing the automatic pattern matching over to the manual pattern matching.
Figure 27:
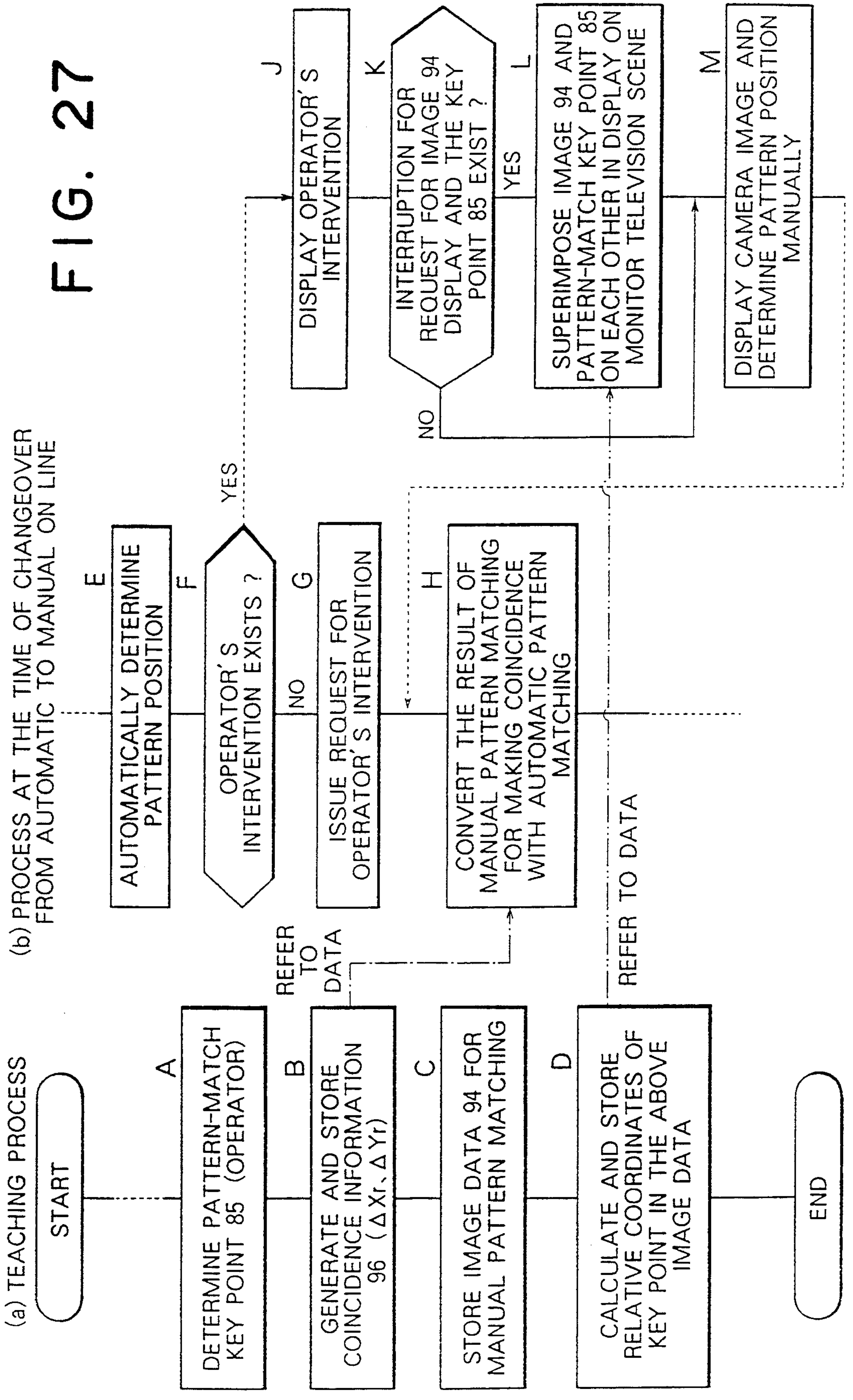
FIG. 27 is a flow chart showing the details of the process for changing the automatic pattern matching over to the manual pattern matching.

The theory of changing over automatic pattern matching to manual (interactive) pattern matching in one process, as the greatest feature of the present invention, will be described. FIG. 26 shows the structure of the process for changing over automatic pattern matching to manual (interactive) pattern matching. As described above, the pattern pitch determination window 61, the feature point indicating window 50 and the pattern-matching key point 85 are determined by using the screen 47 of the monitor television at the teaching stage. As also described above, the X- and Y-axis projection histogram (teaching ranges) 59 and 57 can be determined on the basis of the feature point indicating window 50 and the pattern pitch determination window 51. Here is shown the fact that the result of manual pattern matching can be converted into data suitable for automatic pattern matching by storing the pattern-matching key point 85 and the distances ΔXr and ΔYr of the two feature quantities (X- and Y-axis projection histograms (teaching ranges) 59 and 57) from the origin in the coordinate system at the time of the teaching. Further, it is necessary to display the position of the pattern form to be designated as a pattern-matching point on the screen by the operator when the operator intervention is required in the automatic pattern matching process. Therefore, the image 94 containing the neighbor of the feature point at the time of the teaching and the coordinates (Xr, Yr) 95 of the pattern-match key point are stored in advance so that the two data can be displayed on the monitor television so as to be superposed on each other on the basis of the request from the operator as occasion demands. FIG. 27 is a flow chart showing the details of the automatic manual pattern-match changeover process.

We claim:

1. An image recognition device having a pattern recognition device for recognizing, with respect to predetermined regions of cloth having patterns thereon, positional relationships between said predetermined regions and said patterns through image analysis according to preliminarily taught conditions, wherein said pattern recognition device comprises:

recognition means for performing automatic pattern recognition on the basis of said image analysis for each of said predetermined regions of said cloth;

means for giving said operator an instruction to conduct manual pattern matching and for displaying conditions necessary for the manual pattern matching selected from among said preliminarily taught conditions, when a pattern matching point at which automatic pattern recognition by said recognition means is impossible appears;

recognition priority means for judging that a preliminarily taught pattern position cannot be determined by said recognition means according to said image analysis;

means for informing an operator of said judgment by said recognition priority means;

erroneous recognition monitoring means for automatically detecting erroneous pattern recognition by said recognition means;

erroneous recognition interruption means for interrupting pattern recognition operation to allow for manual pattern recognition when said erroneous pattern recognition is detected by said erroneous recognition monitoring means; and recognition process changeover means for determining a pattern position when changing from automatic pattern recognition to manual pattern recognition, and for switching back to automatic pattern recognition.

2. An image recognition device in which a visual image of a textile having pattern-forms thereon is viewed by a camera to thereby perform pattern-form recognition and matching according to preliminarily taught image viewing conditions, comprising:

pattern-form specification means for preliminarily teaching and storing a pattern-form specification;

pattern-form recognition means for retrieving said stored preliminarily taught pattern-form specification;

storing means for storing preliminarily taught image viewing conditions; and storage retrieving means for retrieving said stored preliminarily taught image viewing conditions from said storing means when pattern-form recognition and matching is to be performed according to said preliminarily taught pattern-form specification, so that said image viewing conditions remain the same as at the time of teaching and storing, wherein said storage retrieving means comprises:

video signal selecting and conversion means for selecting and storing a video signal of said textile having pattern-forms thereon for conversion to a digital image to emphasize said specified pattern-form of said textile;

input image brightness adjusting means for determining the brightness of the optimal image for recognizing said specified pattern-form on said textile, and for storing a plurality of conditional values required for adjusting to various pattern-forms;

camera view field selection means for selecting a camera view field of said textile according to the degree of detail of said specified pattern-form and the size of the pitch of said specified pattern-form, and means for storing camera view field information for various pattern-forms.

3. An image recognition device according to claim 2, further comprising means for controlling a camera positioning robot for setting the position of the camera to an optimal position for performing image processing above the vicinity of a pattern-matching point, wherein, coordinates RBx(i) and RBy(i) define said optimal point positioning for robot processing and are defined by:

$$RBx(i) = X(i-1) + x(i) - x(i-1)$$

$$RBy(i) = Y(i-1) + y(i) - y(i-1)$$

whereby when data received as the result of pattern-form recognition is expressed by distance from the center of the camera view (DX,DY), the pattern position on said textile is defined by:

$$X(i)=RBx(i)+DX,$$

$$Y(i)=RBy(i)+DY.$$

4. An image recognition device according to claim 1, wherein said erroneous recognition monitoring means for automatically detecting erroneous pattern recognition can be operated manually.

* * * * *